(12) United States Patent
McAlpine et al.

(10) Patent No.: US 11,320,323 B2
(45) Date of Patent: May 3, 2022

(54) ADDITIVELY MANUFACTURED FLEXIBLE ELECTRONIC SENSORS AND CONDUCTIVE COMPOSITIONS USED THEREIN

(71) Applicant: Regents of the University of Minnesota, Minneapolis, MN (US)

(72) Inventors: Michael C. McAlpine, Minneapolis, MN (US); Shuangzhuang Guo, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 153 days.

(21) Appl. No.: 16/123,346

(22) Filed: Sep. 6, 2018

(65) Prior Publication Data

US 2019/0072439 A1  Mar. 7, 2019

Related U.S. Application Data

(60) Provisional application No. 62/554,895, filed on Sep. 6, 2017.

(51) Int. Cl.
*G01L 1/14* (2006.01)
*H01B 1/22* (2006.01)
(Continued)

(52) U.S. Cl.
CPC ............ *G01L 1/146* (2013.01); *B29C 64/106* (2017.08); *B29C 64/209* (2017.08);
(Continued)

(58) Field of Classification Search
CPC ......... G01L 1/146; G01L 1/205; G01L 5/228; H01B 1/22; B29C 64/393; B29C 64/209;
(Continued)

(56) References Cited

U.S. PATENT DOCUMENTS 4,302,361 A  11/1981 Kotani et al.
4,634,623 A   1/1987 Watkins
(Continued)

FOREIGN PATENT DOCUMENTS

CN   104854176 A  *  8/2015  ............. C08K 3/041
EP    0210002 A1     1/1987
(Continued)

OTHER PUBLICATIONS

Zhu et al., "3D Printed Functional and Biological Materials on Moving Freeform Surfaces," Advanced Materials, vol. 30, Issue 23, Apr. 25, 2018, 8 pp.
(Continued)

*Primary Examiner* — Jonathan M Dunlap
(74) *Attorney, Agent, or Firm* — Shumaker & Sieffert, P.A.

(57) ABSTRACT

Techniques are described for additive manufacturing, e.g., 3D printing, stretchable tactile sensors. As described, the techniques may allow the stretchable tactile sensors to be 3D printed under ambient conditions via nanocomposite inks. In various embodiments, sinter-free inks are described with adjustable viscosities and electrical conductivities. Moreover, conductive compositions are described in which micron or submicron-sized silver particles are dispersed in a highly stretchable silicone elastomer. Techniques are described herein in which the inks are used 3D printing process to form tactile sensing platforms and integrated arrays.

20 Claims, 18 Drawing Sheets

(51) Int. Cl.

| | |
|---|---|
| *B29C 64/393* | (2017.01) |
| *B29C 64/209* | (2017.01) |
| *B29C 64/106* | (2017.01) |
| *G01L 1/20* | (2006.01) |
| *G01L 5/22* | (2006.01) |
| *B33Y 30/00* | (2015.01) |
| *B33Y 50/02* | (2015.01) |
| *B33Y 70/00* | (2020.01) |
| *B33Y 80/00* | (2015.01) |
| *B33Y 10/00* | (2015.01) |
| *B29L 31/34* | (2006.01) |
| *B29K 21/00* | (2006.01) |
| *B29K 105/16* | (2006.01) |
| *B29K 505/14* | (2006.01) |

(52) U.S. Cl.
CPC ............ *B29C 64/393* (2017.08); *B33Y 10/00* (2014.12); *B33Y 30/00* (2014.12); *B33Y 50/02* (2014.12); *B33Y 70/00* (2014.12); *B33Y 80/00* (2014.12); *G01L 1/205* (2013.01); *G01L 5/228* (2013.01); *H01B 1/22* (2013.01); *B29K 2021/00* (2013.01); *B29K 2105/162* (2013.01); *B29K 2505/14* (2013.01); *B29K 2995/0005* (2013.01); *B29L 2031/34* (2013.01); *B29L 2031/3406* (2013.01)

(58) Field of Classification Search
CPC ....... B29C 64/106; B33Y 30/00; B33Y 50/02; B33Y 70/00; B33Y 80/00; B33Y 10/00; B29L 2031/34; B29L 2031/3406; B29K 2021/00; B29K 2105/162; B29K 2995/0005; B29K 2505/14
See application file for complete search history.

(56) References Cited

U.S. PATENT DOCUMENTS

| | | | |
|---|---|---|---|
| 5,928,569 | A | 7/1999 | Reo |
| 6,017,587 | A | 1/2000 | Kleyer et al. |
| 9,502,638 | B2 | 11/2016 | Mcalpine et al. |
| 9,517,128 | B2 | 12/2016 | Mcalpine et al. |
| 9,776,364 | B2 | 10/2017 | Wang |
| 9,841,750 | B2 | 12/2017 | Willis et al. |
| 9,887,356 | B2 | 2/2018 | Mcalpine et al. |
| 10,612,986 | B2 | 4/2020 | Lewis et al. |
| 2002/0022136 | A1 | 2/2002 | Valade et al. |
| 2014/0257518 | A1 | 9/2014 | Mcalpine et al. |
| 2015/0159057 | A1 | 6/2015 | Henckens et al. |
| 2016/0017185 | A1 | 1/2016 | Albaugh et al. |
| 2016/0167309 | A1 | 6/2016 | Liu et al. |
| 2016/0198576 | A1 | 7/2016 | Lewis et al. |
| 2017/0050382 | A1 | 2/2017 | Minardi et al. |

FOREIGN PATENT DOCUMENTS

| | | |
|---|---|---|
| WO | WO2012/078820 A2 | 6/2012 |
| WO | 2016/145309 A1 | 9/2016 |
| WO | WO2018014440 A1 | 1/2018 |

OTHER PUBLICATIONS

"Electrically Conductive Plastic Film—Black, carbon-filled, volume-conductive polethylene film," CAPLINQ, retrieved from https://www.caplinq.com/electrically-conductive-plastic-film.html, retrieved on Aug. 10, 2020, 15 pp.

"Capture Life—Start streaming high fidelity gestural data straight out of the box," StretchSense, retrieved from https://stretchsense.com/, retrieved on Aug. 10, 2020, 6 pp.

U.S. Appl. No. 62/693,146, by Regents of the University of Minnesota (Inventors: McAlpine et al.), filed Jul. 2, 2018.

Leigh et al., "A Simple, Low-Cost Conductive Composite Material for 3D Printing of Electronic Sensors," PLOS One, vol. 7, Issue 11, Nov. 2012, 6 pp.

Matsuhisa et al., "Printable elastic conductors with a high conductivity for electronic textile applications," Nature Communications, vol. 6, Issue 1, Jun. 25, 2015, 11 pp.

Amjadi et al., "Stretchable, Skin-Mountable, and Wearable Strain Sensors and Their Potential Applications: A Review," Advanced Functional Materials Journal, DOI: 10.1002/adfm.201504755, Feb. 17, 2016, 22 pp.

Nuchitprasitchai et al., "Three Hundred and Sixty Degree Real-Time Monitoring of 3-D Printing Using Computer Analysis of Two Camera Views," Journal of Manufacturing and Materials Processing, DOI: 10.3390/jmmp1010002, Jul. 4, 2017, 32 pp.

Sitthi-Amorn et al., "MultiFab: A Machine Vision Assisted Platform for Multi-material 3D Printing," The Computation Fabrication Group, AMC Transactions on Graphics, Aug. 27, 2015, 11 pp.

FeiYu et al., In situ repair of bone and cartilage defects using 3D scanning and 3D printing, Scientific Reports, DOI: 10.1038/s41598-017-10060-3, Aug. 25, 2017, 12 pp.

Guo et al., "3D Printed Stretchable Tactile Sensors," Advanced Materials, Advanced Science News, DOI: 10.1002/adma.201701218, May 5, 2017, 28 pp.

Valentine et al., "Hybrid 3D Printing of Soft Electronics," Advanced materials, Advanced Science News, DOI: 10.1002/adma.201703817, Sep. 6, 2017, 8 pp.

O'Neill et al., "3D Bioprinting Directly Onto Moving Human Anatomy," IEEE/RSJ International Conference on intelligent Robots and Systems (IROS), Sep. 24-28, 2017, 7 pp.

Muth et al., "Embedded 3D Printing of Strain Sensors within Highly Stretchable Elastomers," Advanced Materials, vol. 26, Issue 36, Jun. 16, 2014, 6 pp.

Rogers et al., "Materials and Mechanics for Stretchable Electronics," Science Mag, vol. 327, Issue 5973, DOI: 10.1126/science.1182383, Mar. 26, 2010, 6 pp.

Yoshimura et al., "Flexible tactile sensor materials based on carbon microcoil/silicone-rubber porous composites," Elsevier Ltd., Composites Science and Technology, Dec. 29, 2015, 9 pp.

Skylar-Scott et al., "Laser-assisted direct ink writing of planar and 3D metal architectures," Proceedings of the National Academy of Sciences of the United States of America, vol. 112, No. 22, May 31, 2016, 6 pp.

Mohammed et al., "All-Printed Flexible and Stretchable Electronics," Advanced Materials, Advanced Science News, DOI: 10.1002/adma.201604965, Mar. 1, 2017, 7 pp.

Shida et al., "A Coil-Based Multifunctional Three-Dimensional Tactile Sensor," IMTC 2004—Instrumentation and Measurement Technology Conference, May 18-20, 2004, 6 pp.

Chi et al., "A New Multifunctional Three-Dimensional Tactile Sensor Using Three Coils," Japanese Journal of Applied Physics, vol. 43, No. 4A, Apr. 9, 2004, 7 pp.

Kenry et al., "Emerging flexible and wearable physical sensing platforms for healthcare and biomedical applications," Microsystems & Nanoengineering, DOI: 10.1038/micronano.2016.43, Sep. 26, 2016, 19 pp.

Noh, "Conductive Elastomers for Stretchable Electronics, Sensors and Energy Harvesters," MDPI, Polymers, DOI: 10.3390/polym8040123, vol. 8, Issue 4, Mar. 10, 2016, 19 pp.

Büscher et al., "Flexible and stretchable fabric-based tactile sensor," Elsevier Ltd., Robotics and Autonomous Systems, Sep. 16, 2014, 9 pp.

Abbasi et al., "Rheological properties and percolation in suspensions of multiwalled carbon nanotubes in polycarbonate," Rheologica Acta, Dec. 2009, 18 pp.

"Flexible, High Temperature, Electrically Conductive Ink," Creative Materials, Nov. 7, 2016, accessed on Jan. 10, 2019, 1 pp.

Yang et al., "Silver Nanowires: From Scalable Synthesis to Recyclable Foldable Electronics," Advanced Materials, vol. 23, Issue 27, May 17, 2017, 5 pp.

Edwards et al., Evaluation of Biomechanical Properties of Human Skin, Elsevier Science, Inc., Jul. to Aug. 1995, 6 pp.

(56) References Cited

OTHER PUBLICATIONS

Zhao et al. "An integrated CNC accumulation system for automatic building-around-inserts," Journal of Manufacturing Processes, vol. 15, Elsevier, ScienceDirect, Jul. 11, 2013, 12 pp.
"Flexible, High Temperature, Electrically Conductive Ink," Creative Materials, www.creativematerials.com, revision date Nov. 11, 2016, 1 pp.
Ahn et al., "Omnidirectional Printing of Flexible, Stretchable, and Spanning Silver Microelectrodes," Science, vol. 323, www.sciencemag.org, Mar. 20, 2009, 4 pp.
Muth et al., "3D Printing of Free Standing Liquid Metal Microstructures," ResearchGate, Advanced Materials, Sep. 2013, 6 pp.
Abbasi et al., "Rheological properties and percolation in suspension of multiwalled carbon nanotubes in the polycarbonate," Rheologica Acta, vol. 48, Issue 9, Jul. 17, 2009, 18 pp.
Al-Saleh et al., "A review of vapor grown carbon nanofiber.polymer conductive composites," Carbon, vol. 47, Elsevier, ScienceDirect, Sep. 23, 2008, 21 pp.
Yamada et al., "A stretchable carbon nanotube strain sensor for human-motion detection," Nature Nanotechnology, vol. 6, May 2011, 7 pp.
Kolesky et al., "3D Bioprinting of Vascularized, Heterogeneous Cell-Laden Tissue Constructs," Advanced Materials, vol. 26, Issue 19, Feb. 18, 2014, 7 pp.
Chen et al., "Printed Carbon Nanotube Electronics and Sensor Systems," Advanced Materials, vol. 28, Issue 22, Feb. 16, 2016, 18 pp.
Xu et al., "Highly Conductive and Stretchable Silver Nanowire Conductors," Advanced Materials, vol. 24, Issue 37, Jul. 12, 2012, 9 pp.
Frutiger et al., "Capacitive Soft Strain Sensors via Multicore-Shell Fiber Printing," Advanced Materials, vol. 27, Issue 15, Mar. 9, 2015, 7 pp.
"Electrically Conductive Plastic Film," Caplinq Specialty Chemicals, Plastics & Products, accessed from https://www.caplinq.com/electrically-conductive-plastic-film.html, accessed on Oct. 15, 2019, 10 pp.
"Dragon Skin Series—Additional Cure Silicone Rubber Compounds," Smooth-On, www.smooth-on.com, accessed from https://web.archive.org/web/20190506111935/https://www.smooth-on.com/product-line/dragon-skin/, accessed on Jan. 17, 2019, 2 pp.
"Stretchable Inks for Wearable Electronics," Dupont—Electronic Solutions, accessed from https://www.dupont.com/products/stetchable-inks-for-wearable-electronics.html, accessed on Jan. 10, 2019, 1 pp.
"E-Silicone," envisionTEC, accessed from https://envisiontec.com/wp-content/uploads/2016/09/2018-E-Silicone.pdf, accessed on Oct. 15, 2019, 1 pp.
Lewis et al., "Direct Ink Writing of Three-Dimensional Ceramic Structures," Journal of American Ceramic Society, vol. 89, No. 12, Dec. 2006, 11 pp.
Hardin et al., "Microfluidic Printheads for Multimaterial 3D Printing of Viscoelastic Inks," Advanced Materials, vol. 27, Issue 21, Paril 17, 2015, 6 pp.
Gong et al., "A wearable and highly sensitive pressure sensor with ultrathin gold nanowires," Nature Communications, vol. 5, Issue 1, Feb. 4, 2014, 8 pp.
Jang et al., "Rugged and breathable forms of stretchable electronics with adherent composite substrates for transcutaneous monitoring," Nature Communications, vol. 5, Issue 1, Sep. 3, 2014m 10 pp.
Zang et al., "Flexible suspended gate organic thin-film transistors for ultra-sensitive pressure detection," Nature Communications, vol. 6, Issue 1, Mar. 3, 2015, 9 pp.
Mannoor et al., "3D Printed Bionic Ears," National Institute of Health, Nano Letters, vol. 13, Issue 6, Jun. 12, 2013, 12 pp.
Ranky, "Customizable Embedded Sensors via Additive Manufacturing for Monitoring in Medical Applications," A thesis presented to the Department of Mechanical and Industrial Engineering, Northeastern University, Dec. 2012, 196 pp.

Gupta et al., "3D Printed Programmable Release Capsules," Department of Health & Human Services, Nano Letters, vol. 15, Issue 8, Aug. 12, 2015, 20 pp.
Johnson et al., "3D Printed Anatomical Nerve Regeneration Pathways," Department of Health & Human Services, Advanced Functional Mater, vol. 25, Issue 39, Oct. 21, 2015, 27 pp.
Mikey77, "Conductive Rubber: Make Touch Sensitive Robot Skin," Circuits, accessed from https://www.instructables.com/id/Conductive-Rubber-Make-Touch-Sensitive-Robot-Skin/, accessed Oct. 15, 2019, 12 pp.
Blorgggg, "Silc Circuits: High Performance Conductive Silicone," Circuits, accessed from https://www.instructables.com/id/Silc-Circuits-High-Performance-Conductive-Silicone/, accessed Jan. 10, 2009, 40 pp.
Johnson et al., "3D Printed Nervous System on a Chip," Department of Health & Human Services, Lap Chip, vol. 16, Issue 8, Apr. 21, 2016, 14 pp.
Kong et al., "3D Printed Bionic Nanodevices," Department of Health & Human Services, Nano Today, vol. 11, Issue 3, Jun. 1, 2016, 41 pp.
Lind et al., "Instrumented cardiac microphysiological devices via multi-material 3D printing," Department of Health & Human Services, Nat Mater, vol. 16, Issue 3, Mar. 24, 2017, 14 pp.
Liu et al., "Rapid Continuous Multi-Material Extrusion Bioprinting," Department of Health & Human Services, Advanced Materials, vol. 29, Issue 3, Jan. 2017, 18 pp.
Smay et al., "Colloidal Inks for Directed Assembly of 3-D Periodic Structures," Langmuir, vol. 18, May 31, 2002, 9 pp.
Homan et al., Bioprinting of 3D Convoluted Renal Proximal Tubules on Perfusable Chips, Scientific Reports, vol. 6, Oct. 11, 2016, 13 pp.
"Rapidly produce medical and dental models and devices," Stratasys, accessed from https://www.stratasys.com/materials/search/biocompatible, accessed on Jan. 1, 2019, 5 pp.
Xu et al., "Materials and Fractal Designs for 3D Multifunctional Integumentary Membranes with Capabilities in Cardiac Electrotherapy," Advanced Materials, vol. 27, Jan. 12, 2015, 8 pp.
Araki et al., "Printable and Stretchable Conductive Wirings Comprising Silver Flakes and Elastomers," IEEE Electron Device Letters, vol. 32, No. 10, Oct. 2011, 3 pp.
Kong et al., "Simple and rapid micropatterning of conductive carbon composites and its application to elastic strain sensors," ScienceDirect, Carbon, vol. 77, May 16, 2014, 9 pp.
O'Neill et al., "3D Bioprinting Directly Onto Moving Human Anatomy," IEEE/RSJ International Conference on Intelligent Robots and Systems (IROS), Vancouver, BC, Sep. 24-28, 2017, 7 pp.
Bausch et al., "InSPIREd—Advances in Conformal Printing: 3D Printing onto Unknown Uneven Systems," IEEE International Conference on Advanced Intelligent Mechatronics (AIM), Munich, Jul. 3-7, 2017, 6 pp.
Xu et al., "Soft Microfluidic Assembles of Sensors, Circuits, and Radios for the Skin," Science, vol. 344, Issue 6179, Apr. 4, 2014, 7 pp.
Someya et al., "The rise of plastic bioelectronics," Nature—International Journal of Science, vol. 540, Issue No. 7633, Dec. 15, 2016, 9 pp.
Khatyr et al., "Model of the viscoelastic behavior of skin in vivo and study of anisotropy," Skin and Research Technology, vol. 10, Issue 2, Apr. 2, 2004, 8 pp.
Xu et al., "An Epidermal Stimulation and Sensing Platform for Sensorimotor Prosthetic Control, Management of Lower Back Exertion, and Electrical Muscle Activation," Advanced Materials, vol. 28, Issue 22, Jun. 8, 2016, 10 pp.
Chortos et al., "Pursuing prosthetic electronic skin," Nature Materials—A Nature Research Journal, vol. 15, Jul. 4, 2016, 14 pp.
Nghiem et al., "Providing a Sense of Touch to Prosthetic Hands," Plastic and Reconstructive Surgery, vol. 135, Issue 6, Jun. 2015, 12 pp.
Hammock et al., "25$^{th}$ Anniversary Article: The Evolution of Electronic Skin (E-Skin): A Brief History, Design Considerations, and Recent Progress," Advanced Materials, vol. 25, Issue 24, Oct. 22, 2013, 42 pp.

(56) References Cited

OTHER PUBLICATIONS

Mannsfeld et al., "Highly sensitive flexible pressure sensors which microstructure rubber dielectric layers," Nature Materials—A Nature Research Journal, vol. 9, Sep. 12, 2010, 6 pp.

Guo et al., "Solvent-Cast Three-Dimensional Printing Multifunctional Microsystems," Nano Micro Small, vol. 9, Issue 24, Jul. 4, 2013, 5 pp.

Truby et al., "Printing soft matter in three dimensions," Nature—International Journal of Science, vol. 540, Issue 7633, Dec. 15, 2016, 10 pp.

Farahani et al., Three-Dimensional Printing of Multifunctional Nanocomposites: Manufacturing Techniques and Applications, Advanced Materials, vol. 28, Issue 28, May 2, 2016, 28 pp.

Guo et al., "Properties of Polylactide Inks for Solvent-Cast Printing of Three-Dimensional Freeform Microstructures," Langmuir, Volume 30, Issue 4, Jan. 11, 2014, 9 pp.

Kong et al., "3D Printed Quantum Dot Light-Emitting Diodes," American Chemical Society, Nano Letters, vol. 14, Issue 12, Oct. 31, 2014, 7 pp.

Farahani et al., "Direct-write fabrication of freestanding nanocomposite strain sensors," IOP Publishing LTD, Nanotechnology, vol. 23, Issue 8, Feb. 1, 2012, 10 pp.

Guo et al., "3D printing of a multifunctional nanocomposite helical liquid sensor," Royal Society of Chemistry, Nanoscale, vol. 7, Issue 15, Mar. 12, 2015, 6 pp.

Lewis et al., "Three-dimensional printed electronics," Nature—International Journal of Science vol. 518, Issue 7537, Feb. 5, 2015, 5 pp.

McCracken et al., "Programming Mechanical and Physiochemical Properties of 3D Hydrogel Cellular Microcultures via Direct Ink Writing," Advanced Healthcare Materials, vol. 5, Issue 9, Feb. 29, 2016, 15 pp.

Roy et al., "Elastomeric skin selection for a fluid-filled artificial fingertip," Journal of Applied Polymer Science, vol. 127, Issue 6, Jun. 7, 2012, 10 pp.

Pang et al., "A flexible and highly sensitive strain-gauge sensor using reversible interlocking of nanofibers," Nature Materials, vol. 11, Jul. 29, 2012, 7 pp.

Boland et al., "Sensitive electromechanical sensors using viscoelastic graphene-polymer nanocomposites," Science Magazine, vol. 354, Issue 6317, Dec. 9, 2016, 6 pp.

Passieux et a., "Instability-Assisted Direct Writing of Microstructured Fibers Featuring Sacrificial Bonds," Advanced Materials, May 15, 2015, 5 pp.

\* cited by examiner

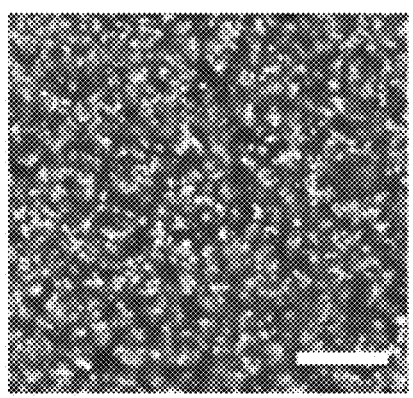
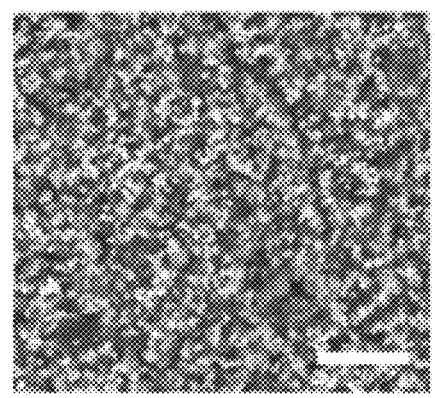
FIG. 4A  FIG. 4B
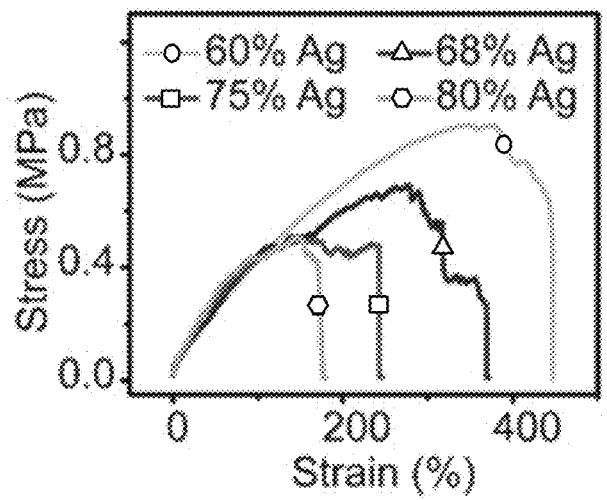
FIG. 5
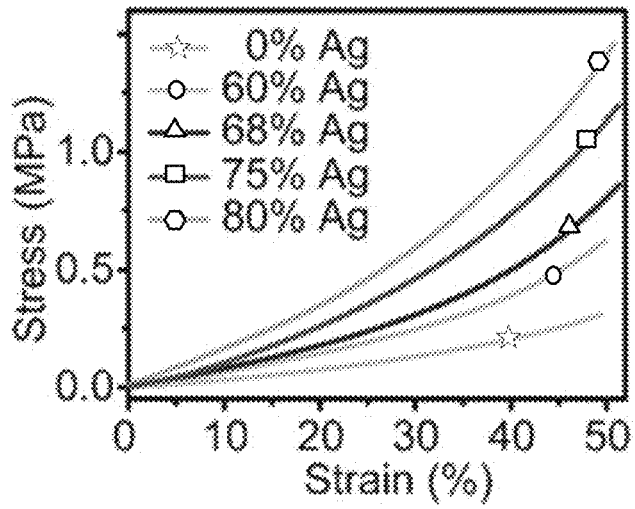
FIG. 6

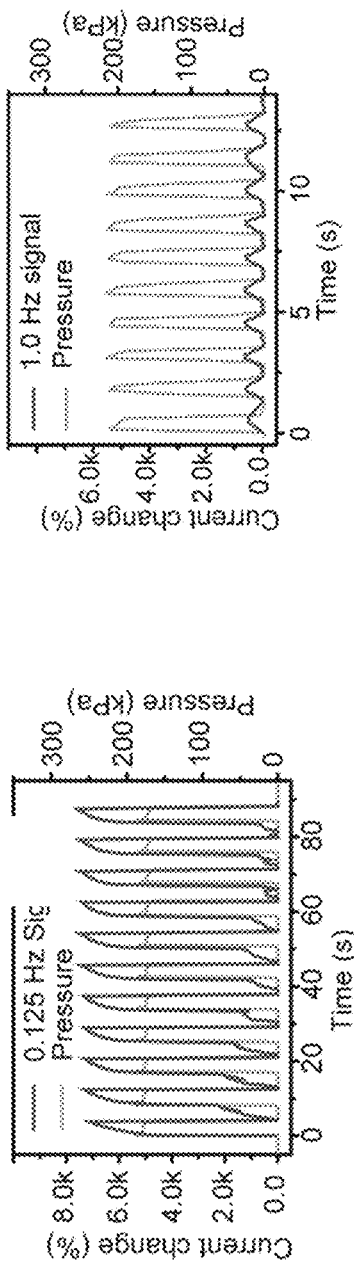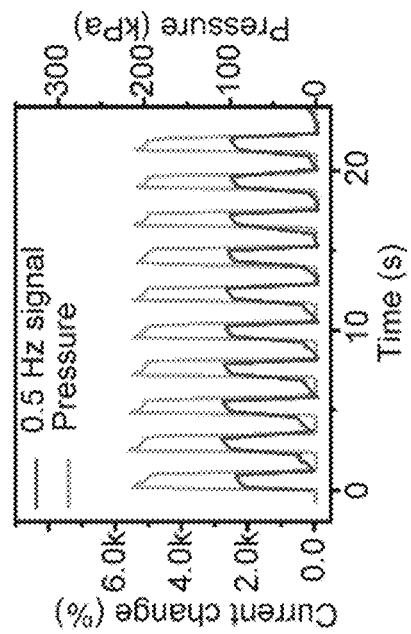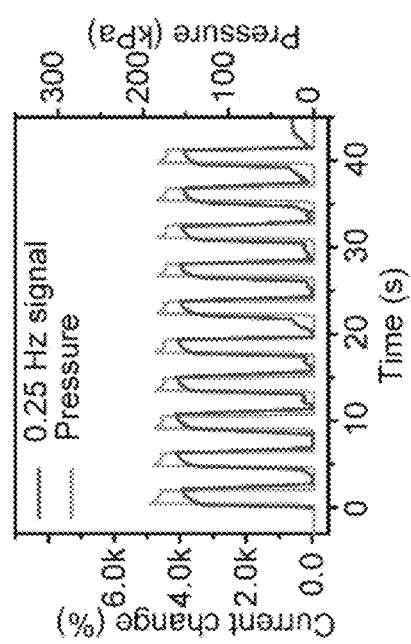
FIG. 15A
FIG. 15B
FIG. 15C
FIG. 15D ial Application No. 62/554,895 filed Sep. 6, 2017, which is
incorporated herein by reference in its entirety.

GOVERNMENT RIGHTS

This invention was made with government support under
EB020537 awarded by National Institutes of Health. The
government has certain rights in the invention.

TECHNICAL FIELD

This disclosure relates to systems and compositions for
additively manufacturing flexible electronic components
and sensors.

BACKGROUND

Flexible and stretchable electronic devices and sensors
have a number of applications, for example, biomedical
applications such as monitoring physiological parameters.
Facilitating biointegration of wearable electronic devices
with human skin may be important for devices in direct
contact with skin. Conventional strategies for fabrication
flexible electronics may be based on techniques such as spin
coating, photolithography, and metal deposition, which may
require expensive cleanrooms for implementation.

Stretchable electronic devices may be used to mimic the
properties of skin could have profound implications for
prosthetics and medicine. Tactile feedback in electronic
replacements for skin may be based on capacitive and or
other mechanisms. Manufacture of such devices has been
complex and expensive. While capacitive sensors may have
a good sensitivity, linearity, and temperature invariance,
their performance may be influenced by electromagnetic
interference, often requiring shielding to achieve high signal-to-noise ratios.

SUMMARY

The disclosure describes techniques and compositions for
additively manufacturing electronic components. The techniques may be particularly useful for additively manufacturing wearable stretchable electronic devices. For example,
design and fabrication techniques are described herein for
additive manufacturing, e.g., 3D printing, stretchable tactile
sensors. As described, the techniques may allow the stretchable tactile sensors to be 3D printed under ambient conditions using, for example, nanocomposite inks. In various
embodiments, sinter-free inks are described that are suitable
for the 3D printing process and that behave as conductive
compositions with adjustable viscosities and electrical conductivities. For example, conductive compositions are
described in which micron or sub-micron silver particles are
dispersed in a highly stretchable silicone elastomer. Techniques are described herein in which the inks are used 3D
printing process to form tactile sensing platforms and integrated arrays.

In some examples, devices formed using techniques
according to the disclosure may be used for one or more of
conformal, non-invasive, or real-time monitoring of stress or
strain of tissue, tissue engineered constructs, organs, and
organ models, to assess properties such as viability, biophysics, viscoelasticity, and mechanics, which may have use
in in-vitro and pre-clinical applications.

The techniques may provide certain technical advantages,
such as enabling 3D printing under mild, ambient conditions
that are compatible with various biological substrates. For
example, in various implementations, the ink materials
described herein for 3D printing flexible electronic circuits,
such as tactile sensors, are configured to ensure smooth flow
through fine deposition nozzles during the printing process
and to promote high stretchability while maintaining good
electrical conductivity of the printed features, but without
curing or sintering in harsh conditions (i.e., high temperature, intense UV). Moreover, the described inks provide
sufficient structural integrity to withstand drying without
delamination or distortion.

In some examples, an example system for additively
manufacturing an electronic sensor includes at least one
extrusion nozzle, at least one material repository, and a
controller. The at least one extrusion nozzle is directed
towards a build substrate. The at least one material repository is configured to hold at least one room-temperature
curable conductive composition. The at least one material
repository is fluidically connected to the at least one nozzle.
The controller includes control circuitry, and a data storage
module configured to store a model of the electronic component. The control circuitry is configured to control the at
least one extrusion nozzle based on the model to cause
extrusion of at least one room-temperature curable conductive composition in a predetermined pattern on or adjacent
to the build substrate, wherein the predetermined pattern of
the composition defines at least one portion of the at least
one electronic component.

In some examples, an example room-temperature curable
conductive composition for additive manufacturing of an
electronic sensor includes a room-temperature curable elastomeric matrix and micron or sub-micron electrically conductive particles dispersed in the room-temperature curable
elastomeric matrix. The micron or sub-micron electrically
conductive particles exhibit a predetermined percolation
threshold concentration (% weight/weight) with respect to
the room-temperature curable conductive composition. The
conductive composition is curable to form a high-sensitivity
cured conductive composition having a first pressure-dependent conductance sensitivity when the micron or sub-micron
electrically conductive particles are present at a total concentration that is within ±2% units of the percolation threshold concentration. The conductive composition is curable to
form a low-sensitivity cured composition having a second
pressure-dependent conductance sensitivity when the total
concentration of the micron or sub-micron electrically conductive particles is greater than the percolation threshold
concentration by at least 5% units. The first pressure-dependent conductance sensitivity is at least ten times the
second pressure-dependent conductance sensitivity.

In some examples, a tactile sensor includes at least one
electrode layer and at least one sensor element adjacent to
the at least one electrode layer. The at least one sensor
element includes a high-sensitivity cured conductive composition. The high-sensitivity cured conductive composition
includes a room-temperature cured elastomeric matrix and
micron or sub-micron electrically conductive particles dispersed in the room-temperature cured elastomeric matrix.
The micron or sub-micron electrically conductive particles
exhibit a predetermined percolation threshold concentration
(% weight/weight) with respect to the room-temperature
curable conductive composition. The micron or sub-micron
electrically conductive particles are present at a total concentration that is within ±2% units of the percolation threshold concentration. The high-sensitivity cured conductive composition exhibits a pressure-dependent conductance sensitivity of at least 10,000% per 250 kPa.

The details of one or more examples are set forth in the accompanying drawings and the description below. Other features, objects, and advantages will be apparent from the description and drawings, and from the claims.

BRIEF DESCRIPTION OF DRAWINGS

FIG. 4A is a photograph showing a scanning electron microscope image of a conductive composition including 68 wt. % of silver particles dispersed in an elastomer.

FIG. 4B is a photograph showing a scanning electron microscope image of a conductive composition including 75 wt. % of silver particles dispersed in an elastomer.

FIG. 5 is a chart illustrating tensile strength measurements for sample conductive compositions loaded with different concentrations of silver particles.

FIG. 6 is a chart illustrating compressive strength measurement for sample conductive compositions loaded with different concentrations of silver particles.

FIGS. 15A, 15B, 15C, and 15D are charts illustrating frequency responses to an applied dynamic pressure of a sample additively manufactured tactile sensor for respective frequencies.

DETAILED DESCRIPTION

The disclosure describes example systems, techniques, and compositions for additively manufacturing electronic components. The disclosure also describes additively manufactured electronic components, for example, tactile sensors, that may be constructed according to the techniques described herein.

Figure 1A:
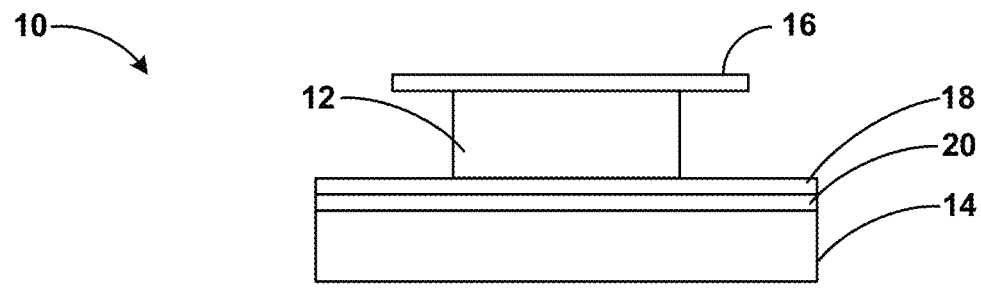
FIG. 1A is a conceptual and schematic diagram of a tactile sensor including at least one sensor element and at least one electrode layer.

For example, FIG. 1A is a conceptual and schematic diagram of a tactile sensor 10 constructed using the additive manufacturing techniques described herein, where the tactile sensor includes at least one sensor element 12 and at least one electrode layer 14.

In some examples, tactile sensor 10 includes a plurality of electrode layers including electrode layer 14 configured as a bottom electrode layer and top electrode layer 16. In the example of FIG. 1A, sensor element 12 is positioned between top electrode layer 16 and bottom electrode layer 14. In some examples, sensor element 12 includes an electrically-conductive layer, block, coil, tube, or cylinder.

As described herein, the techniques may provide the technical advantage of allowing stretchable tactile sensors, such as tactile sensor 10 of FIG. 1, to be 3D printed under ambient conditions via nanocomposite inks. In various embodiments, sinter-free inks are described with adjustable viscosities and electrical conductivities for 3D printing tactile sensing platforms and integrated arrays, such as tactile sensor 10.

The techniques may provide certain technical advantages, such as enabling 3D printing under mild, ambient conditions that are compatible with various biological substrates that may be incorporated in or otherwise used when forming the electronic components, such as tactile sensor 10.

For example, sensor element 12 may be constructed from a conductive material, for example, a material having measurably high conductivity, and formed in a predetermined geometry or shape. In some examples, sensor element 12 includes a high-sensitivity cured conductive composition. A high-sensitivity composition is a composition that exhibits a measurably high sensitivity to pressure, and exhibits a measurably high change in conductance in response to applied pressure, for example, a change in conductance greater than a predetermined threshold.

As described herein, the high-sensitivity cured conductive composition may include a room-temperature cured elastomeric matrix (not shown) and micron or sub-micron electrically conductive particles (not shown). Micron or sub-micron particles refers to particles having an average particle size of about a micron or less than a micron (for example, about 1 μm, or less than 1 μm, less than 800 nm, less than 600 nm, less than 500 nm, less than 400 nm, less than 300 nm, less than 200 nm, or less than 100 nm). Particles having an average particle size of about a micron or less than a micron may provide a relatively high conductive path under ambient conditions without blocking fine printing nozzles or channels.

The micron or sub-micron electrically conductive particles are dispersed in the room-temperature cured elastomeric matrix. For example, the micron or sub-micron electrically conductive particles may be substantially homogenously distributed within the room-temperature cured elastomeric matrix. The micron or sub-micron electrically conductive particles may impart conductivity to or enhance the conductivity of the room-temperature cured elastomeric matrix. For example, the room-temperature cured elastomeric matrix may be substantially non-conductive, or have a low electrical conductivity. However, the micron or sub-micron electrically conductive particles may be present in a concentration sufficient to provide an electrically conductive path within the room-temperature cured elastomeric matrix. For example, adjacent particles may contact at neighboring surfaces or be sufficiently proximate to allow electrical conduction across the particles to provide a conductive path through the high-sensitivity cured composition. The micron or sub-micron electrically conductive particles may include one or more metal or alloy particles, or glass, polymer, ceramic, or other particle cores coated with conductive shells. In some examples, the metal or alloy particles include one or more of silver, gold, copper, or nickel. The micron or sub-micron electrically conductive particles may be provided with any suitable shape or geometry. For example, the micron or sub-micron electrically conductive particles may include one or more of spheroidal particles, nanowires, rod-shaped particles, ellipsoidal particles, or flakes.

The conductivity of the composition depends on the concentration of the conductive particles in the composition. For example, if the concentration of the conductive particles is too low, the particles may not sufficiently contact each other or be too distant from each other to provide a conductive path. If the concentration of the conductive particles is relatively high, a sufficient number or sub-population of the particles may contact each other or be sufficiently proximate to provide a conductive path. The conductivity may increase as the concentration of the conductive particles in the conductive composition increases.

In general, conductive particles may exhibit a predetermined percolation threshold concentration (% weight/weight) with respect to the room-temperature curable conductive composition. The percolation threshold may depend on one or more of average particle size, particle size distribution, or the composition of the conductive nanoparticles. In some examples, the percolation threshold weight percentage concentration may be about 67.45% by weight with respect to the room-temperature curable conductive composition.

Depending on the concentration of the particles relative to the percolation threshold, the conductive composition may be a high-sensitivity composition or a low sensitivity composition. A high-sensitivity composition is a composition that exhibits a relatively high pressure-dependent conductance sensitivity, for example, a pressure-dependent conductance sensitivity that is greater than or about a predetermined threshold. For example, the conductance of the composition may change in response to the application of pressure or compression on the composition. Without wishing to be bound by theory, on the application of pressure, the average inter-particle distance may get shortened compared to the inter-particle distance in an uncompressed configuration. The extent of the change in the average inter-particle distance may depend on the flexibility and stretchability of the elastomeric matrix, the initial average inter-particle distance, and the average size of the particles. A shortened inter-particle distance may improve conductance, for example, by promoting inter-particle electron transfer. Thus, at concentrations near the percolation threshold, applying pressure or compression or withdrawing applied pressure or compression may result in a measurable change in conductivity. For example, when the micron or sub-micron electrically conductive particles are present at a total concentration that is within ±2% units of the percolation threshold concentration, the high-sensitivity cured conductive composition may exhibit a pressure-dependent conductance sensitivity of at least 10,000% per 250 kPa, or at least 15,000% per 250 kPa applied pressure, or at least 17,000% per 250 kPa applied pressure. Thus, in some examples, the high-sensitivity cured conductive composition includes about 68 wt. % of conductive (silver) particles (close to a percolation threshold of 67.45%), and the pressure-dependent conductance sensitivity of the high-sensitivity cured conductive composition is at least 17,000% per 250 kPa. The measured conductance of a high-sensitivity composition may be indicative of pressure or compression applied to the high-sensitivity composition. For example, a relation between conductance and pressure may be established by calibration a structure including a high-sensitivity composition, and the calibration curve may be used to determine an unknown pressure based on a measure conductance. Thus, a high-sensitivity composition may be used in sensor elements to determine applied pressure, or a tactile input applied to the sensor elements, by determining the conductance exhibited by the sensor elements.

At concentrations greater than the percolation threshold, the conductivity may exhibit a relatively low pressure-dependent conductance sensitivity, for example, a pressure-dependent conductance sensitivity that is less than a predetermined threshold. For example, at concentrations greater than the percolation threshold, the average inter-particle distance may not significantly change upon the application of pressure or withdrawal of applied pressure, and the conductance through the composition may not be significantly affected. In some examples, a composition including a concentration of conductive particles at least 3% greater than, or at least 5% greater than, or at least 7%, or at least 10% greater than the percolation threshold may be a low-sensitivity composition. For example, at concentrations of about 70 wt. %, or 75 wt. %, or 80 wt. %, or higher, a low-sensitivity composition may exhibit a relatively low pressure-dependent conductance sensitivity of less than 1,000% per 250 kPa, or of less than 280% per 250 kPa. Further, at concentrations above the percolation threshold, the composition may exhibit a relatively high electrical conductivity while exhibiting low-sensitivity to pressure, because the higher concentration of the particles may result in a relatively shortened inter-particle distance, promoting conductance through the composition.

At concentrations lower than the percolation threshold, pressure or compression may not significantly influence the conductivity. For example, at the lower concentrations, the average inter-particle distance may be sufficiently high such that the composition exhibits low or substantially no conductivity, with particle separation preventing electron transfer or migration. Thus, even if the applied pressure reduces the average inter-particle distance, the resulting average inter-particle distance even on the application of pressure may not be sufficient to promote conductance, when concentrations are lower than the percolation threshold. Thus, at concentrations below the percolation threshold, the composition may exhibit a relatively low electrical conductivity or be substantially isolating.

Thus, the same or similar elastomeric compositions may be provided with different concentrations of particles to prepare high-sensitivity or low-sensitivity compositions and high-conductivity or low-conductivity compositions. Different components of tactile sensor 10 may be prepared using different high-sensitivity or low-sensitivity compositions as appropriate, or by varying the concentration of conductive particles in substantially the same matrix composition. For example, a composition including a room-temperature curable elastomeric matrix and micron or sub-micron electrically conductive particles dispersed in the room-temperature curable elastomeric matrix may exhibit different sensitivities depending on the concentration of the micron or sub-micron electrically conductive particles. In some examples, the conductive composition is curable to form a high-sensitivity cured conductive composition having a first pressure-dependent conductance sensitivity when the micron or sub-micron electrically conductive particles are present at a total concentration within ±2% units of the percolation threshold concentration, and curable to form a low-sensitivity cured composition having a second pressure-dependent conductance sensitivity when the total concentration of the micron or sub-micron electrically conductive particles is greater than the percolation threshold concentration by at least 5% units. In some such examples, the first pressure-dependent conductance sensitivity is at least ten times the second pressure-dependent conductance sensitivity. Thus, different curable compositions including different predetermined concentrations of conductive particles may be deposited in predetermined patterns and cured to form electronic components by additive manufacturing.

In some examples, a room-temperature curable conductive composition for additive manufacturing of an electronic component includes a room-temperature curable elastomeric matrix, and micron or sub-micron electrically conductive particles dispersed in the room-temperature curable elastomeric matrix. The micron or sub-micron electrically conductive particles exhibit a predetermined percolation threshold concentration (% weight/weight) with respect to the room-temperature curable conductive composition. The conductive composition is curable to form a high-sensitivity cured conductive composition having a pressure-dependent conductance sensitivity of at least 10,000% per 250 kPa when the micron or sub-micron electrically conductive particles are present at a total concentration within ±2% units of the percolation threshold concentration. For example, the composition is curable to form the high-sensitivity cured conductive composition having a pressure-dependent conductance sensitivity of at least 10,000% per 250 kPa (or at least 12,000% per 250 kPa, or at least 15,000% per kPa) when the total concentration of the micron or sub-micron electrically conductive particles is within ±1% units of the percolation threshold concentration. In some examples, the composition is curable to form the high-sensitivity cured conductive composition having a pressure-dependent conductance sensitivity of at least 10,000% per 250 kPa when the total concentration of the micron or sub-micron electrically conductive particles is about 68% by weight with respect to the room-temperature curable elastomeric composition. For example, the pressure-dependent conductance sensitivity of the high-sensitivity cured conductive composition may be at least 17,000% per 250 kPa.

The conductive composition is curable to form a low-sensitivity cured composition having a pressure-dependent conductance sensitivity of less than 1,000% per 250 kPa (or less than 900% per 250 kPa, or less than 500% per 250 kPa, or less than 300% per 250 kPa) when the total concentration of the micron or sub-micron electrically conductive particles is greater than the percolation threshold concentration by at least 5% units. In some examples, the composition is curable to form the low-sensitivity cured conductive composition having a pressure-dependent conductance sensitivity of less than 1,000% per 250 kPa when the total concentration of the micron or sub-micron electrically conductive particles is greater than about 75% by weight with respect to the to the room-temperature curable elastomeric composition. For example, the pressure-dependent conductance sensitivity of the low-sensitivity cured conductive composition is less than 280% per 250 kPa.

While sensor element 12 may include a high-sensitivity cured composition, other components or portions of tactile sensor 10 may include a low-sensitivity composition. In some examples, at least one electrode layer (for example, one or both of bottom electrode layer 14 and top electrode layer 16) may include a low-sensitivity cured conductive composition. The low-sensitivity cured conductive composition may include the room-temperature cured elastomeric composition, and micron or sub-micron electrically conductive particles dispersed in the room-temperature cured elastomeric matrix, with the total concentration of the micron or sub-micron electrically conductive particles being greater than the percolation threshold concentration by at least 5% units. The increased concentration of the conductive particles in the low-sensitivity composition relative to the concentration in the high-sensitivity composition may provide the low-sensitivity composition with a conductivity that has a low dependence or that is substantially independent of applied pressure. For example, the low-sensitivity cured composition may exhibit a pressure-dependent conductance sensitivity of less than 1,000% per 250 kPa. In some examples, the low-sensitivity cured composition may exhibit a pressure-dependent conductance sensitivity of less than 280% per 250 kPa.

In some examples, tactile sensor 10 may optionally further include at least one non-conductive isolating layer 18. Non-conductive isolating layer 18 may be between sensor element 12 and at least one electrode layer, for example, between bottom electrode 14 and sensor element 12, as shown in FIG. 1A. In other examples, non-conductive isolating layer 18 may be between top electrode 16 and sensor element 12. In examples in which tactile sensor 10 includes two or more electrode layers, the at least non-conductive isolating layer may include a first non-conductive isolating layer 18 between sensor element 12 and one of the at least one electrode layer, and a second non-conductive isolating layer 18 between sensor element 12 and another of the at least one electrode layer.

In some examples, the room-temperature cured elastomeric matrix may include a silicone elastomer. For example, the silicone elastomer may include a room-temperature cured elastomer, such as a two-part elastomer that may be cured by mixing two parts. Providing a room-temperature cured elastomer may allow fabricating tactile sensor 10 by additive manufacturing techniques that do not need an energy source for curing of additively deposited material. For example, conventional additive manufacturing techniques may require an energy source such as a laser, UV light, electron-beam, plasma, or the like, for thermal curing or curing resulting by absorption of the energy or chemical conversion of the energy. Using a room-temperature cured material may obviate the need for using energy sources. For example, the room-temperature cured material may cure on exposure to air, moisture, oxygen, or other chemical species, or may cure as a consequence of a chemical reaction between two or more components. In some examples, a first part of a two-part elastomer may include a first reactant and a second part of a two-part elastomer may include a second reactant such that upon mixing, the first reactant and second reactant chemically react to cure into a cured elastomeric composition. The two parts may be mixed immediately before extrusion from a nozzle, or may be dispensed or extruded from two different nozzles to mix at an extrusion site. Thus, by moving the nozzle or a substrate at which the nozzle is directed, cured elastomeric material may be deposited in a predetermined pattern to form a predetermined component geometry. For example, a controller may control the position and orientation of one or more nozzles relative to a build substrate and control the extrusion of predetermined compositions from the nozzles based on a model to additively deposit an electronic component based on the model.

Figure 1B:
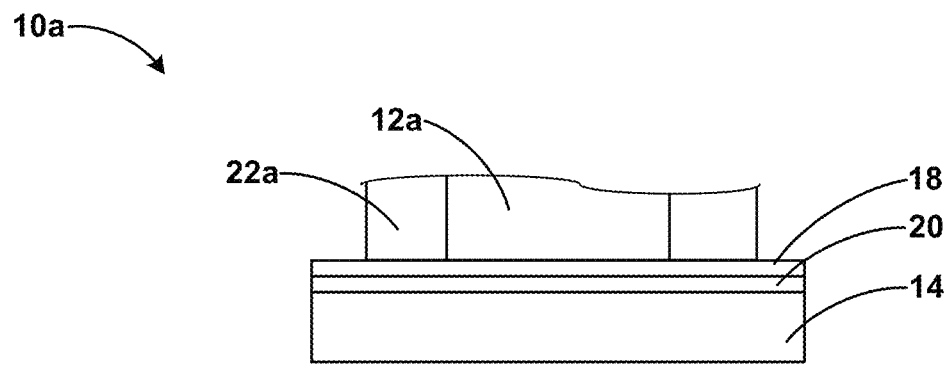
FIG. 1B is a conceptual and schematic diagram of an intermediate additively manufactured article that is a precursor of the tactile sensor of FIG. 1A.

FIG. 1B is a conceptual and schematic diagram of an intermediate additively manufactured precursor sensor 10a that is a precursor of tactile sensor 10 of FIG. 1A during the additive manufacturing process. As seen in FIG. 1B, during manufacturing, precursor sensor 10a includes a partly deposited sensor element 12a and a scaffold 22a. The scaffold 22a may help maintain the orientation of partly deposited sensor element 12a during the additive manufacturing, or may act as a substrate for subsequent components deposited on precursor sensor 10a.

Figure 1C:
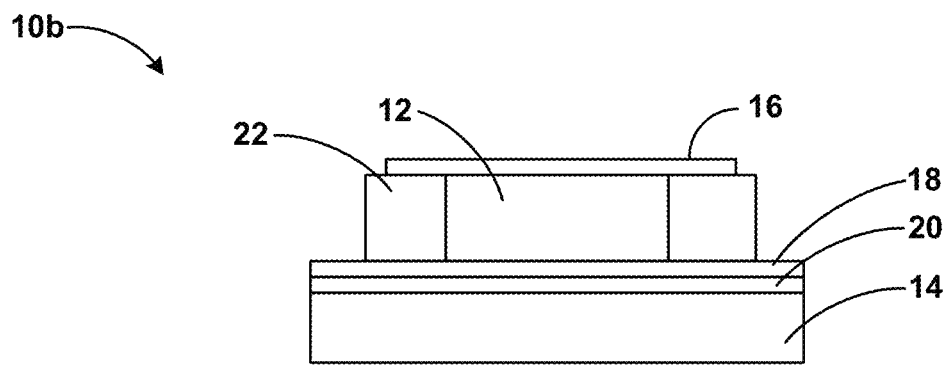
FIG. 1C is a conceptual and schematic diagram of an intermediate additively manufactured article including a scaffold that is a precursor of the tactile sensor of FIG. 1A.

FIG. 1C is a conceptual and schematic diagram of a fully-formed additively manufactured intermediate sensor 10b (e.g., a fully-formed version of sensor 10A) prior to removal of scaffold 22 to form tactile sensor 10 of FIG. 1A. As shown, intermediate sensor 10b includes scaffold 22 surrounding sensor element 12. As seen in FIG. 1C, scaffold 22 holds top electrode in a predetermined orientation relative to sensor element 12 and bottom electrode 14. Scaffold 22 may be removed, for example, by machining, cutting, grinding, dissolving, or any other suitable means, to produce tactile sensor 10 (FIG. 1A) from intermediate sensor 10b.

Figure 2:
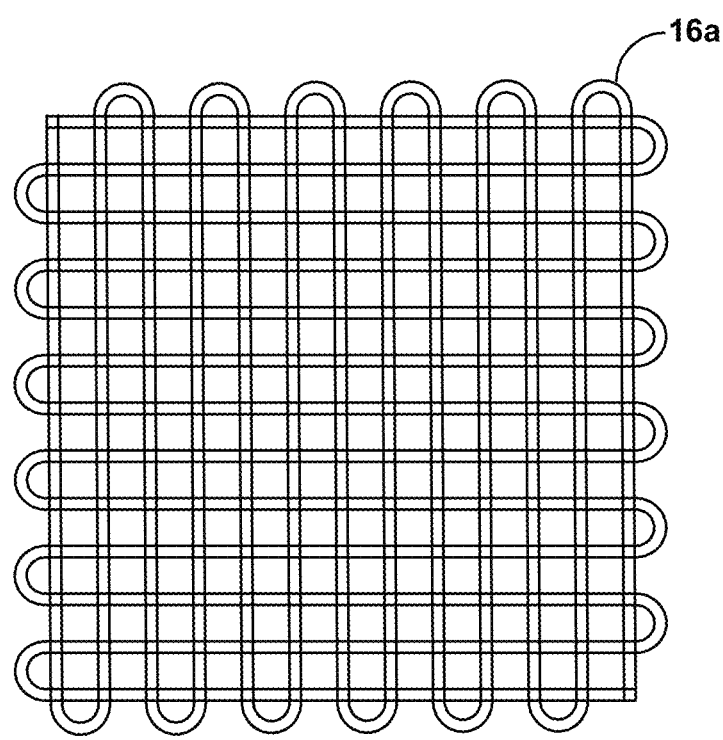
FIG. 2 is a conceptual and schematic diagram of an electrode layer of a tactile sensor.

FIG. 2 is a conceptual and schematic diagram showing a top view of one example of an electrode layer 16a of a tactile sensor, such as tactile sensor 10 of FIG. 1. While one or more electrode layers of tactile sensors according to the disclosure may be provided with any suitable geometry or shape, in some examples, at least one electrode layer is in the form of a relatively flat rectangular or square layer. The layer may be fabricated by additive manufacturing techniques by depositing a composition in a grid, for example, successive horizontal and vertical lines of material. In some examples, adjacent lines of the grid may contact each other. In other examples, adjacent lines of the grid may be spaced from each other, for example, as shown in FIG. 2. In the example shown in FIG. 2, an electrode layer 16a includes a grid formed by additively depositing a low-sensitivity conductive material with a predetermined intra-grid spacing. Providing the intra-grid spacing may reduce the amount of material needed to fabricate electrode layer 16a, while still providing a conductive matrix across a major surface of electrode layer 16a.

Tactile sensor 10 as a whole, or one or more components of tactile sensor 10, may be fabricated using additive manufacturing techniques. While the disclosure provides some examples of additive manufacturing techniques and systems that may be used to fabricate tactile sensors, example tactile sensors according to the disclosure may be fabricated using any suitable technique.

Figure 3:
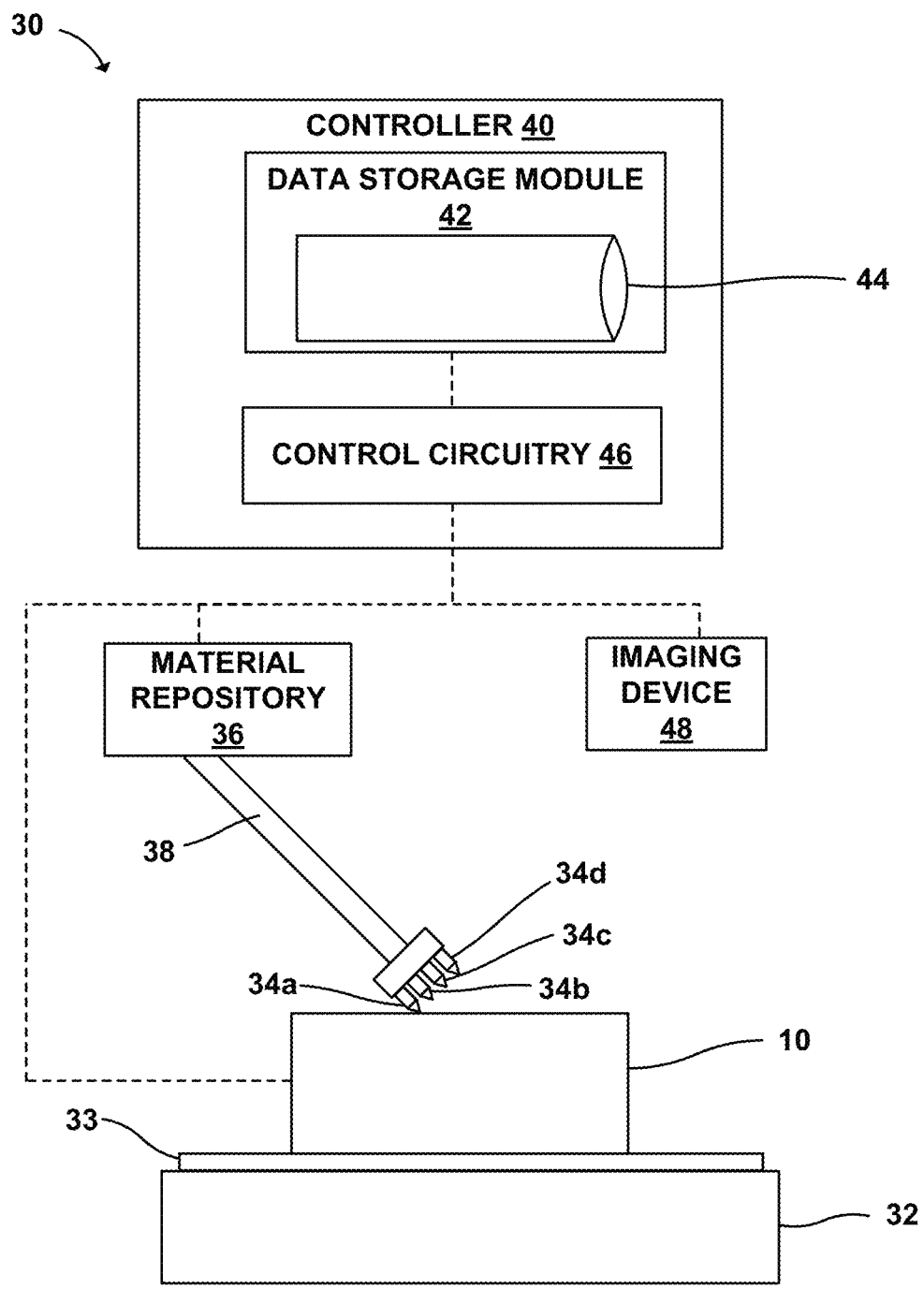
FIG. 3 is a conceptual and schematic diagram of a system for additively manufacturing an electronic component using room-temperature curable conductive compositions.

FIG. 3 is a block diagram of an example system 30 for additively manufacturing an electronic component, for example, tactile sensor 10, using one or more room-temperature curable conductive compositions described herein. In this example, system 30 includes at least one extrusion nozzle 34 directed toward a build substrate 32. Build substrate 32 may include a build platform, for example, a platform having a substantially flat, level, or planar major surface on which to construct the electronic component. In other examples, build substrate 32 may define an arbitrary predetermined surface, for example, a curved, partly curved, or contoured surface. In some examples, build substrate 32 may include a surface conforming to a palm or a hand. Build substrate 32 may include a metal, alloy, polymer, glass, ceramic, biomimetic, biological, skin, or tissue surface. In some examples, build substrate 32 may be optionally provided with a build promoting layer 33, for example, an adhesive or tacky layer or coating that may promote or facilitate the deposition of a first layer, first few layers, or bottom of additively deposited material to build substrate 32. In some examples, the build promoting layer 33 includes a tacky, compliant, or flexible polymer. In some examples, build promoting layer 33 may include silicone grease or a silicone coating or layer.

Extrusion nozzle 34 may include a first extrusion nozzle 34a, a second extrusion nozzle 34b, a third extrusion nozzle 34c, and a fourth extrusion nozzle 34d. While four extrusion nozzles 34a-d are shown in example system 30 illustrated in FIG. 3, in other examples, system 30 may include only one nozzle, or two nozzles, or three nozzles, or more nozzles.

System 30 includes at least one material repository 36 configured to hold at least one room-temperature curable conductive composition. Material repository 36 may be fluidically connected to at least one nozzle 34, for example, by channel 38. Channel 38 may include one or more separate lumens for directing flow of one or more material from material repository 36 to a respective nozzle, for example, a respective nozzle 34a, 34b, 34c, or 34d. In some examples, system 30 includes only a first nozzle 34a and a second nozzle 34b. First nozzle 34a may be fluidically connected to a first repository (or sub-repository) of material repository 36, and second nozzle 34b may be fluidically connected to a second repository (or sub-repository) of material repository 36. For example, the first repository may include a high-sensitivity composition, while the second repository may include a low-sensitivity composition. For example, the first repository may include a first room-temperature curable conductive composition that is a high-sensitivity room-temperature curable composition, while the second repository includes a second room-temperature curable conductive composition that is a low-sensitivity room-temperature curable conductive composition. In some examples, material repository 36 may include a third repository including a substantially insulating or non-conductive composition. Thus, by activating selected nozzles and extruding suitable compositions from one or more repositories, different components of an electrical component exhibiting different conductivities and pressure-sensitivities may be additively deposited.

In some examples, material in material repository 36 may remain in an uncured (curable) state until it is extruded from nozzle(s) 34 to be exposed to air, oxygen, or an atmosphere that promotes curing after extrusion from nozzle(s) 34. In some examples, two parts of a two-part curable composition may remain unmixed or separated in material repository 36, and may be mixed to promote curing during or immediately after extrusion, for example, by mixing in a lumen of nozzle(s) 34 or at a tip of nozzle(s) 34.

System 30 includes a controller 40 for controlling the additive manufacturing or deposition. Controller 40 includes a data storage module configured to store data representative of a model 44 of electronic component 10. Model 44 includes a digital representation of electronic component 10. Controller 40 also includes control circuitry 46 configured to control extrusion nozzle(s) 34 based on model 44 to cause extrusion of the at least one room-temperature curable conductive composition from nozzle(s) 34 in a predetermined pattern on or adjacent to build substrate 32. The predetermined pattern of the composition defines at least one portion of electronic component 10.

In some examples, system 30 further includes at least imaging device 48 configured to image at least a region on or adjacent build substrate 32 or nozzle(s) 34. Control circuitry 46 is coupled to imaging device 48 to receive electronic signals indicative of an image of the at least one region. Control circuitry 46 may be further configured to control nozzle(s) 34 based on a comparison of the image and a reference image derived from model 44.

In some examples, controller 40 may control additive manufacturing system 30 to fabricate component 10 based on model 44. For example, controller 40 may send operational signals to and receive status signals from material repository 36, imaging device 48, and build substrate 32 to control and monitor the operation of additive manufacturing system 30.

In some examples, controller 40 may control material repository 36 to direct a material composition at a build location on partially-fabricated component 10, carried on build substrate 32, or at an initial build location on a region of build substrate 32.

Controller 40 may cause additive manufacturing system 30 to fabricate component 10 by depositing material at different build locations along a predetermined path based on model 44, so that the material is ultimately deposited along a predetermined build direction, for example a vertical build direction upwards (for example, against a gravitational force) or downwards (for example, toward a gravitational force).

In some examples, controller 40 may cause build substrate 32 to remain stationary or allow build substrate 32 to remain stationary as component 10 is fabricated. In other examples, build substrate 32 may be movable or rotatable, for example, along multiple axis, and controller 40 may control the position of build substrate 32 relative to nozzle(s) 34. In some examples, controller 40 may successively move build substrate 32 against the build direction, or to change the build location by changing the orientation of build substrate 32, and that of component 10, relative to nozzle(s) 34.

In some examples, controller 40 may control material repository 36 and nozzle(s) 34, to deposit a layer or volume of material along a series of build locations to fabricate component 10. Therefore, controller 40 may direct build location along a two-dimensional or three-dimensional tool path to fabricate component 10 based on model 44.

In some examples, controller 40 may control imaging device 48 to image surfaces or regions or volumes of one or more of component 10, the build location, or build substrate 32 to generate respective build images periodically or continuously. Controller 40 may periodically or continuously compare the build images with the model 44 to verify that component 10 substantially conforms (e.g., conforms or nearly conforms) to model 44. In some examples, controller 40 may control one or more of material repository 34, nozzle(s) 34, and build substrate 32 based on the build images and the model 44. For example, controller 40 may be configured to control build substrate 32 and material repository 36, and/or imaging device 48 to translate and/or rotate along at least one axis to position component 10 relative to nozzle(s) 34 and/or imaging device 48. Positioning component 10 may include positioning a predetermined surface (e.g., a surface to which material is to be added) of component 10 in a predetermined orientation relative to nozzle(s) 34 and/or imaging device 48, so that material is added in regions or volumes defined by model 44.

In some examples, additive manufacturing system 30 may not include a controller 40, and a computing device may perform one or more functions described with reference to controller 40, instead of controller 40.

In some examples, controller 40 may direct deposition of material on a surface of build substrate 32 or component 10 in a predetermined build direction, for example, a vertical direction pointing away from build substrate 32. Thus, controller 40 may direct material along the build direction, beginning with layers of material on or adjacent build substrate 32 and then continuing to deposit layers that are successively farther away from build substrate 32. For example, controller 40 may first direct nozzle(s) 34 to deposit layers of material forming bottom electrode 14, sensing element 12 (and optionally, scaffold 22), and then continue depositing material along the tool path forming layers of material supported by sensing element 12 or scaffold 22, for example, top electrode 16.

While the example system of FIG. 3 may be used to fabricate example components described above with reference to FIGS. 1 and 2, the example system of FIG. 3 may be used to fabricate other example components.

The present disclosure will be illustrated by the following non-limiting examples.

EXAMPLES

Example 1

Different experimental conductive compositions were formulated and their rheological properties were compared. Conductive compositions were prepared by dispersing submicron silver particles (Sigma-Aldrich, St. Louis, Mo.) in a highly stretchable silicone elastomer, Dragon Skin® 10 Slow Cure Part A and B (Smooth-on, Inc., Macungie, Pa.), which is curable at room temperature (by mixing). The rheological properties and pot-life of the compositions were adjusted by adding chemical agents including Slo-Jo® Platinum Silicone Cure Retarder (Smooth-on, Inc., Macungie, Pa.) as a curing retarder, Thi-Vex Silicone Thickener (Smooth-on, Inc., Macungie, Pa.) as a thickening agent, and a solvent, dichloromethane (DCM).

Compositions including 0 wt. %, 60 wt. %, 68 wt. %, 75 wt. %, and 80 wt. % of silver particles were prepared. Dragon Skin® 10 Part A and B were mixed at 1:1 ratio, followed by addition of Slo-Jo® Cure Retarder (0.5 wt. %) and solvent DCM (10 wt. %). Then, suitable amount of silver particles (0.5-1.0 μm) were mixed with the viscous silicone mixture. A sacrificial composition (for a scaffolding structure) was prepared by mixing 40 wt. % Pluronic F127 (Sigma-Aldrich, St. Louis, Mo.) with ultra-filtrated water to print the supporting layer, which was removed by immersing the device in water for several hours. All the compositions were mixed using a planetary centrifugal mixer ARE-310 (Thinky USA, Laguna Hills, Calif.) and centrifuged to remove any air bubbles before printing at room temperature.

FIG. 4A is a photograph showing a scanning electron microscope image of a conductive composition including 68 wt. % of silver particles dispersed in the elastomer. FIG. 4B is a photograph showing a scanning electron microscope image of a conductive composition including 75 wt. % of silver particles dispersed in the elastomer. As seen in FIGS. 4A and 4B, the particle distributions for each composition are substantially uniform.

Figure 7:
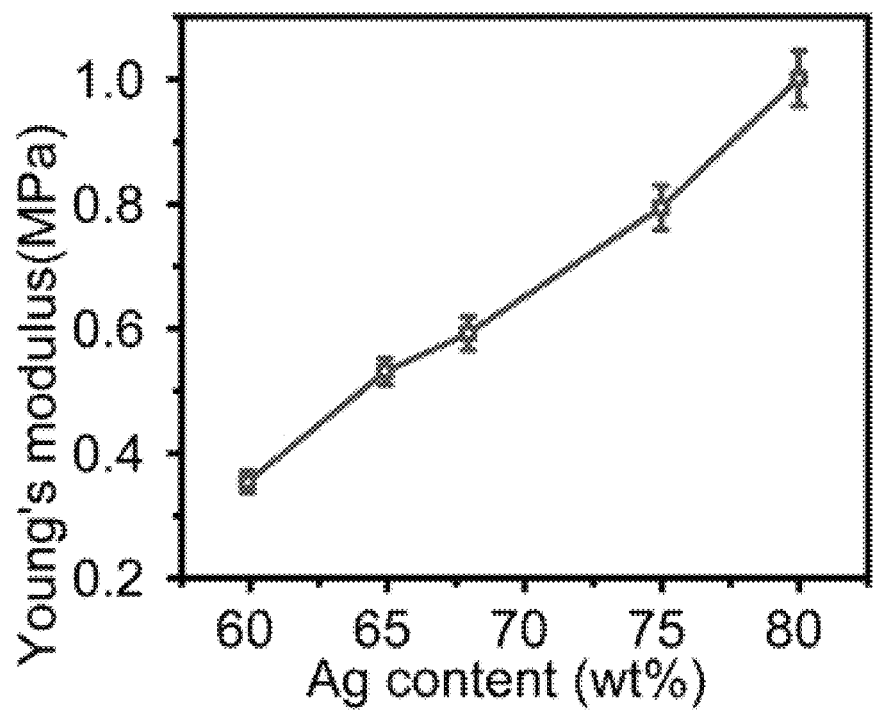
FIG. 7 is a chart illustrating the relation between Young's modulus and silver particle concentration for sample conductive compositions including an elastomeric matrix and different concentrations of silver particles.

FIG. 5 is a chart illustrating tensile strength measurements for sample conductive compositions loaded with different concentrations of silver particles. FIG. 6 is a chart illustrating compressive strength measurement for sample conductive compositions loaded with different concentrations of silver particles. FIG. 7 is a chart illustrating the relation between Young's modulus and silver particle concentration for sample conductive compositions including an elastomeric matrix and different concentrations of silver particles. As seen in FIGS. 5, 6, and 7, with increasing silver content, the stretchability of the cured inks decreased while the modulus increased.

Example 2

Figure 8:
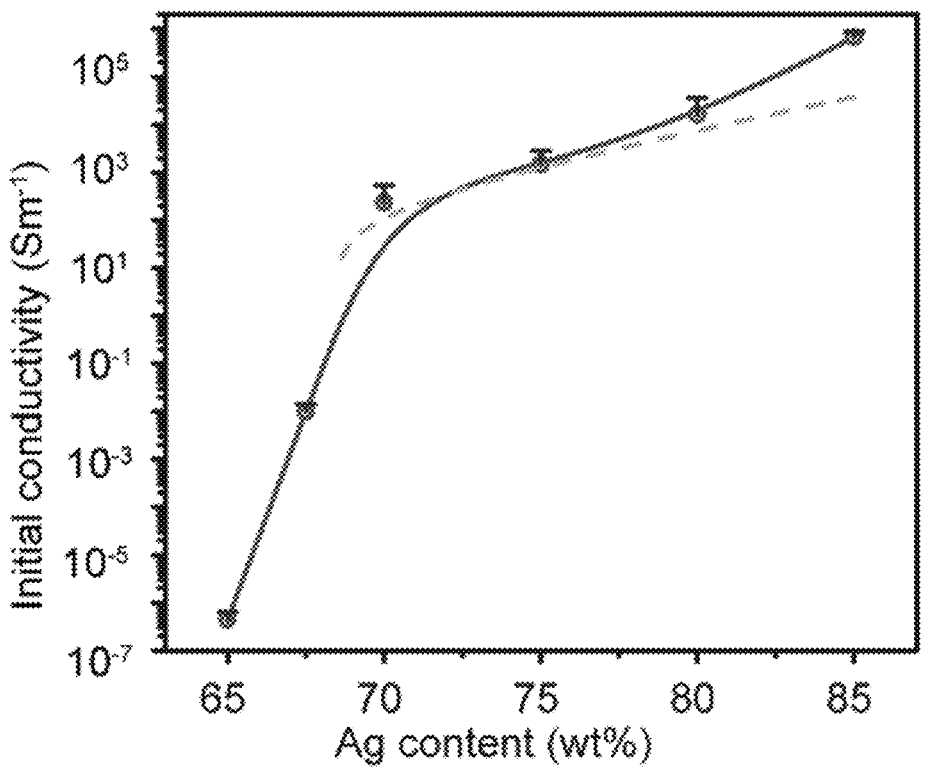
FIG. 8 is a chart illustrating the relation between initial conductivity and silver particle concentration for sample conductive compositions including an elastomeric matrix and different concentrations of silver particles.
Figure 9:
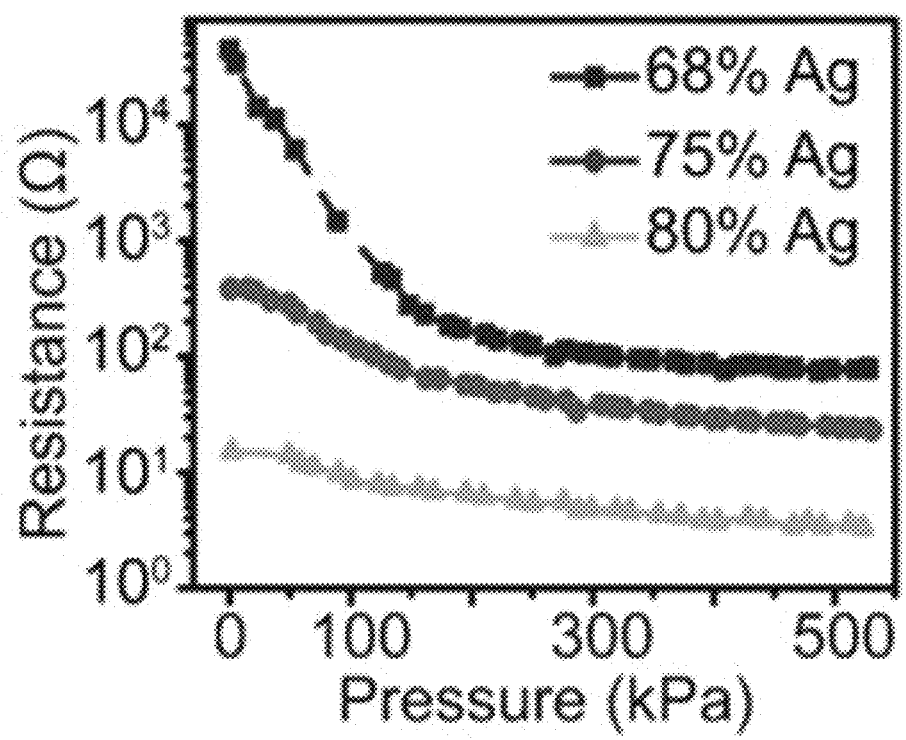
FIG. 9 is a chart illustrating the pressure-sensitivity of resistance for sample conductive compositions loaded with different concentrations of silver particles.

The electrical properties of the different compositions of EXAMPLE 1 were analyzed via four-point probe measurements. The electrical conductivities of the compositions showed particle concentration-dependent behavior. FIG. 8 is a chart illustrating the relation between initial conductivity and silver particle concentration for sample conductive compositions including an elastomeric matrix and different concentrations of silver particles. As seen in FIG. 8, the conductivity increased with loading of silver particles. The percolation threshold was found to be 67.45 wt. %. At the percolation threshold, or near the percolation threshold, for example, 68 wt. %, the three dimensional conductive network is not fully formed. Thus, the conductivity of the composition with 68 wt. % silver loading content is sensitive to applied pressure. FIG. 9 is a chart illustrating the pressure-sensitivity of resistance for sample conductive compositions loaded with different concentrations of silver particles. As seen in FIG. 9, when a continuous pressure was applied to the composition with 68 wt. % silver, its resistance dramatically decreased and finally reached a plateau, resulting in about a 200-fold change in resistance. Under compression, silver particles are forced to pack more closely, increasing electrical conduction pathways, and the composition including 68 wt. % silver concentration was the most sensitive elastic piezoresistive material among the different compositions.

Figure 10:
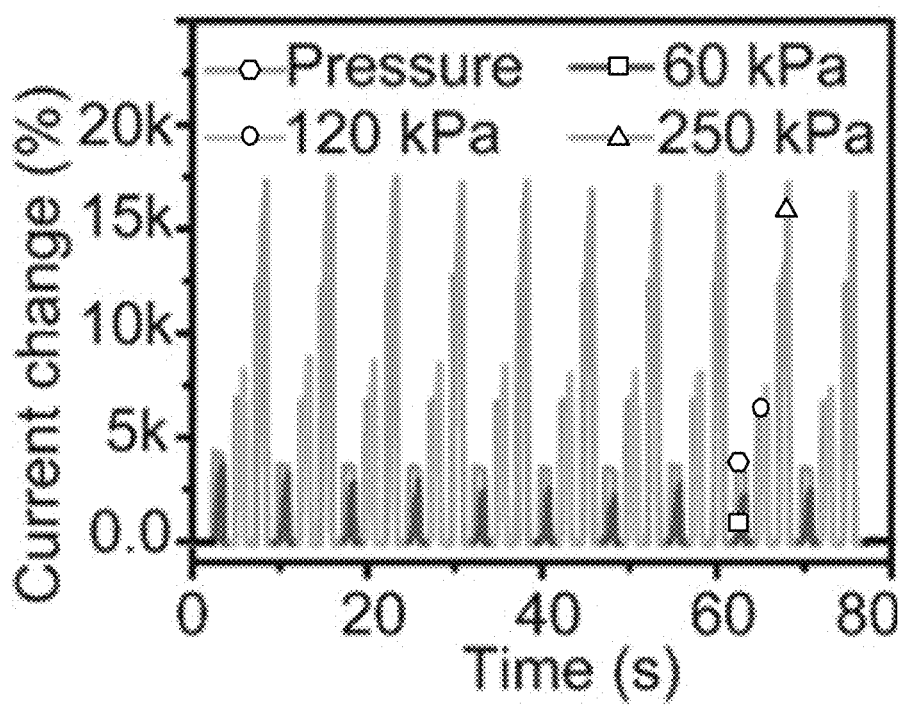
FIG. 10 is a chart illustrating the relative current change of a conductive composition including 68 wt. % of silver particles in silicone in response to three different applied cyclic pressures.

FIG. 10 is a chart illustrating the relative current change of a conductive composition including 68 wt. % of silver particles in silicone in response to three different applied cyclic pressures. As seen in FIG. 10, for the 68 wt. % composition, the relative current changes ($\Delta I/I_0$) were found to be 2500%, 8500%, and 17000% under 60, 120, and 250 kPa cyclic applied loading pressures, respectively. In addition, the significantly lower initial conductivity ($9.9\times10^{-3}$ S m$^{-1}$) and high sensitivity of the compositions with 68 wt. % silver content ensured that the primary electrical signal of the device resulted from deformation of the sensor layer, as a high-sensitivity conductive composition.

Figure 11A:
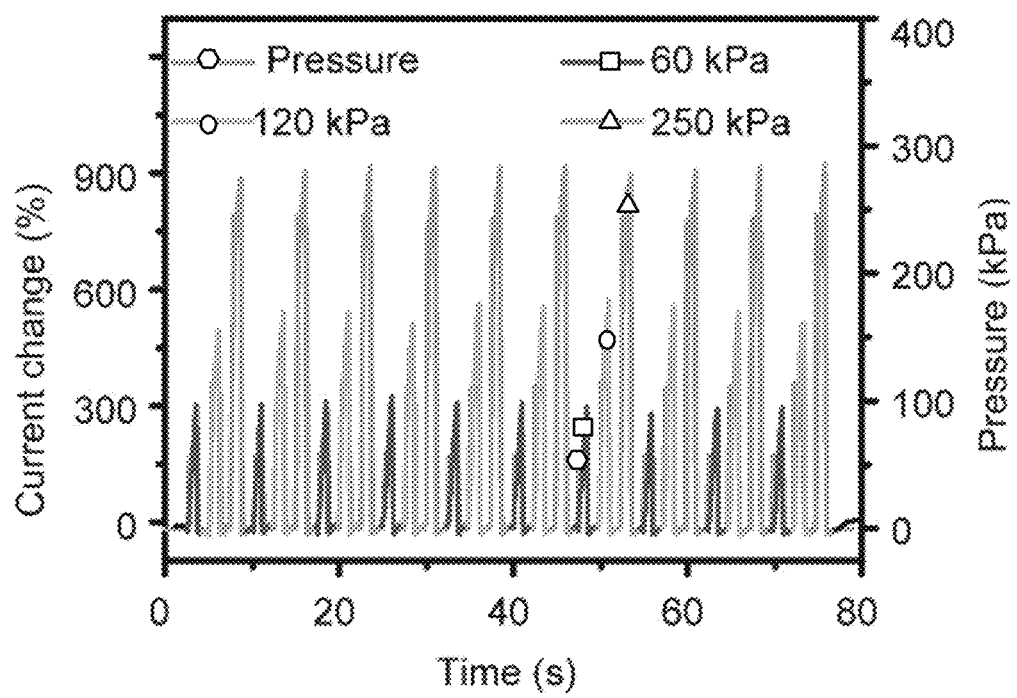
FIG. 11A is a chart illustrating the relative current change of a conductive composition including 75 wt. % of silver particles in silicone in response to three different applied cyclic pressures.
Figure 11B:
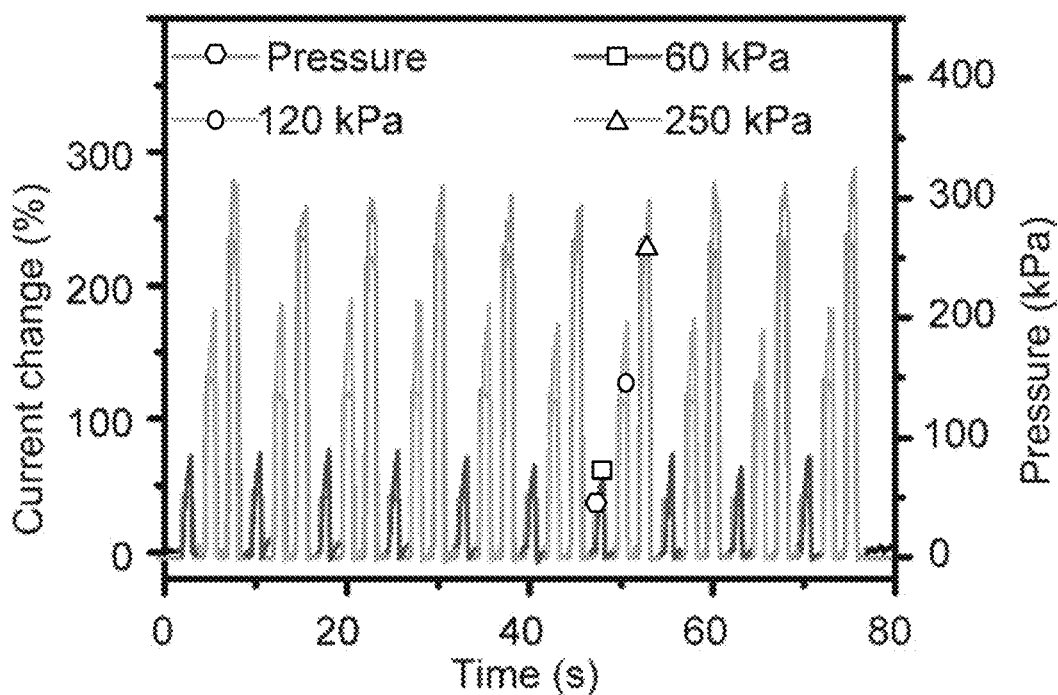
FIG. 11B is a chart illustrating the relative current change of a conductive composition including 80 wt. % of silver particles in silicone in response to three different applied cyclic pressures.

FIG. 11A is a chart illustrating the relative current change of a conductive composition including 75 wt. % of silver particles in silicone in response to three different applied cyclic pressures. FIG. 11B is a chart illustrating the relative current change of a conductive composition including 80 wt. % of silver particles in silicone in response to three different applied cyclic pressures. As seen in FIGS. 11A and 11B, as the silver content increased to 75 wt. % or higher, the conductive network inside the inks surpassed the percolation threshold, and the relative current change decreased to 900% (for 75 wt. %) and 280% (for 80 wt. %), when an equivalent cyclic pressure of 250 kPa was applied. Thus, the ink with 75 wt. % silver was chosen for the electrode layers due to its appropriate balance of high conductivity and stretchability, as a low-sensitivity conductive composition.

Example 3

Figure 12A:
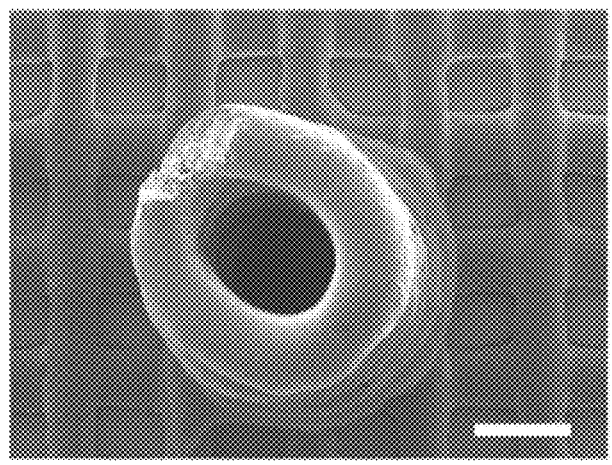
FIG. 12A is a photograph showing a top-view scanning electron microscope image of a sensor element of a sample additively manufactured tactile sensor.
Figure 12B:
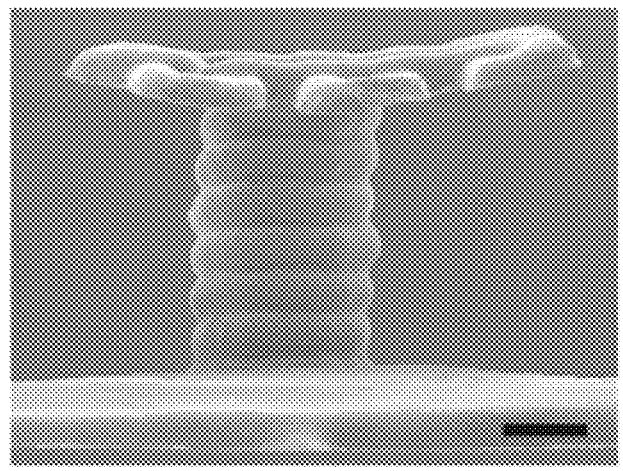
FIG. 12B is a photograph showing a side-view scanning electron microscope image of a sample additively manufactured tactile sensor including the sensor element of FIG. 12A.
Figure 12C:
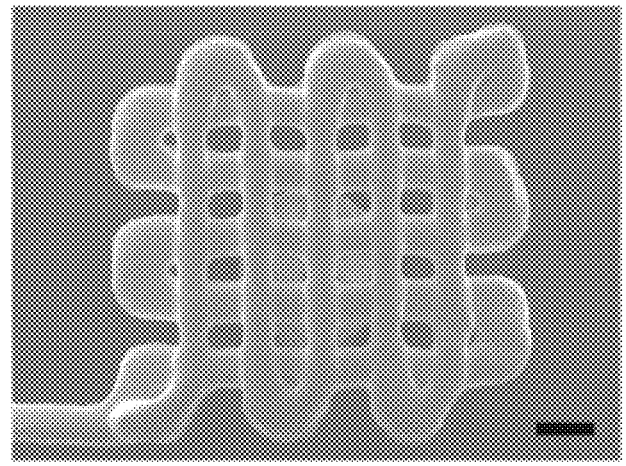
FIG. 12C is a photograph showing a top-view scanning electron microscope image of the sample additively manufactured tactile sensor of FIG. 12B.
Figure 13A:
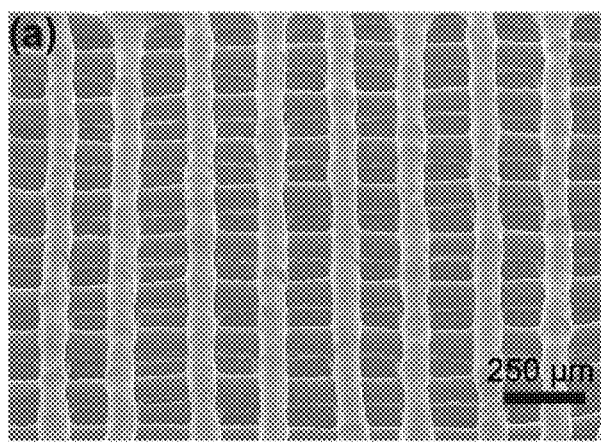
FIG. 13A is a photograph showing a top-view scanning electron microscope image of a bottom electrode of a sample additively manufactured tactile sensor.
Figure 13B:
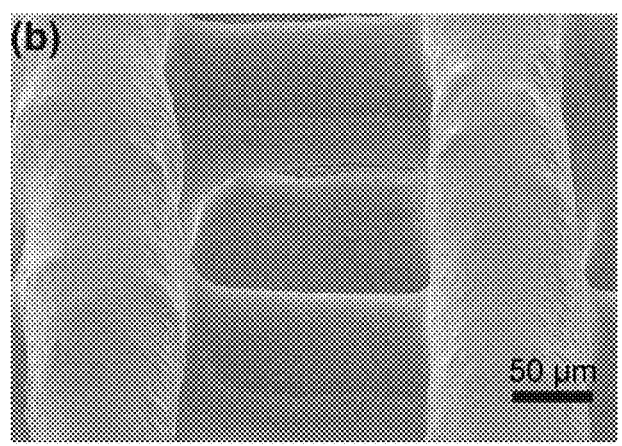
FIG. 13B is a photograph showing an enlarged top-view scanning electron microscope image of the bottom electrode of FIG. 13A.
Figure 13C:
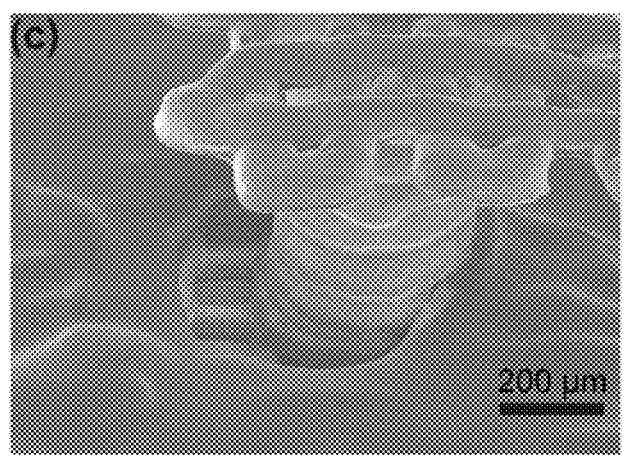
FIG. 13C is a photograph showing a plan-view scanning electron microscope image of a sample additively manufactured tactile sensor including the bottom electrode of FIG. 13A and a top electrode, sensor layer, and isolating layer.

Tactile sensors were prepared using the conductive compositions of EXAMPLES 1 and 2. The tactile sensors included a sensor element, two electrode layers (top and bottom), an isolating layer, and a base layer. Each of these layers were prepared from compositions including Dragon Skin® 10 elastomer matrix including a thickening agent and a curing retarder, in addition to respective concentrations of silver particles. The compositions of the different layers were as follows: (i) base layer: silicone, (ii) bottom electrode: 75 wt. % silver, (iii) sensor layer: 68 wt. % silver, (iv) isolating layer: silicone, (v) supporting layer: 40% Pluronic® (BASF, Florham Park, N.J.) (scaffolding layer that was removed later), and (vi) top electrode: 75 wt. % silver. The layers were deposited in predetermined patterns using additive manufacturing. FIG. 12A is a photograph showing a top-view scanning electron microscope image of a sensor element of a sample additively manufactured tactile sensor. The sensor includes a bottom electrode and a sensor layer. FIG. 12B is a photograph showing a side-view scanning electron microscope image of a sample additively manufactured tactile sensor including the sensor element of FIG. 12A. FIG. 12C is a photograph showing a top-view scanning electron microscope image of the sample additively manufactured tactile sensor of FIG. 12B. FIG. 13A is a photograph showing a top-view scanning electron microscope image of a bottom electrode of a sample additively manufactured tactile sensor. FIG. 13B is a photograph showing an enlarged top-view scanning electron microscope image of the bottom electrode of FIG. 13A. FIG. 13C is a photograph showing a plan-view scanning electron microscope image of a sample additively manufactured tactile sensor including the bottom electrode of FIG. 13A and a top electrode, sensor layer, and isolating layer.

Example 4

Figure 14:
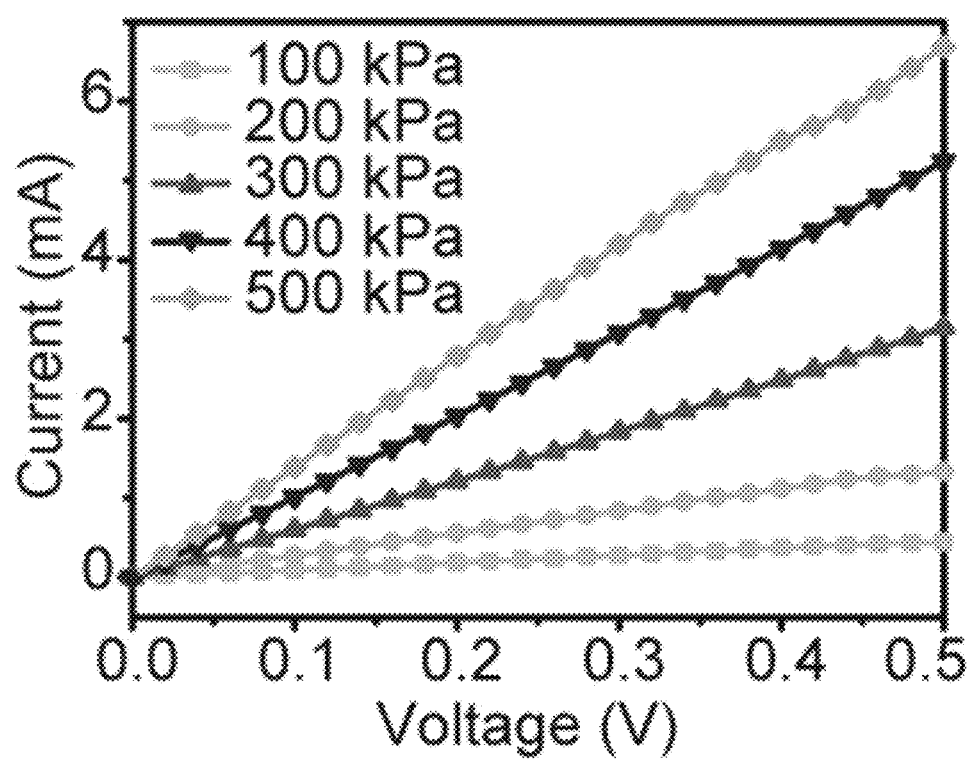
FIG. 14 is a chart illustrating current-voltage characteristics of a sample additively manufactured tactile sensor.

The electrical sensing behavior of the tactile sensors of EXAMPLE 3 were evaluated. FIG. 14 is a chart illustrating current-voltage characteristics of a sample additively manufactured tactile sensor. As seen in FIG. 14, when the top and bottom electrodes were contacted, the device revealed linear I-V (current-voltage) curves. In addition, as the applied pressure increased from 100 to 500 kPa, the resistance of the device decreased ~12-fold, from 1.14 kΩ to 95Ω.

Figure 16:
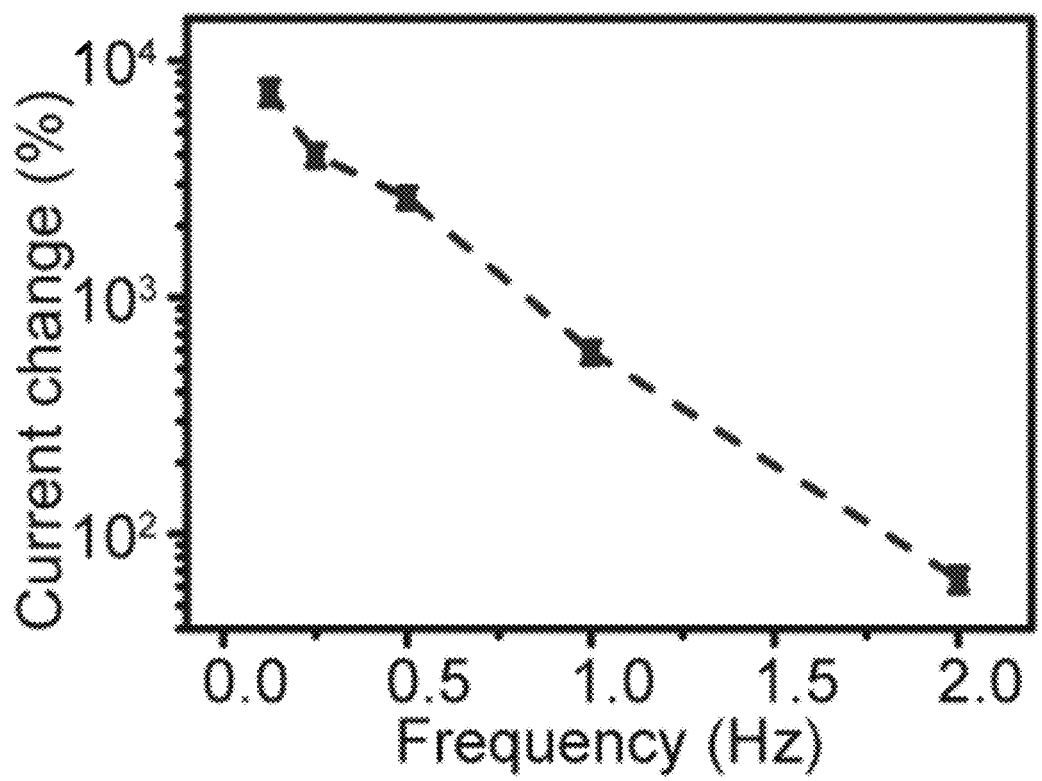
FIG. 16 is a chart illustrating current change in response to applied dynamic pressure frequencies of a sample additively manufactured tactile sensor.

Dynamic testing was conducted. FIGS. 15A, 15B, 15C, and 15D are charts illustrating frequency responses to an applied dynamic pressure of a sample additively manufactured tactile sensor for respective frequencies. FIG. 16 is a chart illustrating current change in response to applied dynamic pressure frequencies of a sample additively manufactured tactile sensor. As seen in FIGS. 15A, 15B, 15C, 15D, and 16, under dynamic testing, the amplitude of output current signals significantly decreased as the input frequency increased from 0.125 to 2 Hz. The hysteresis can be attributed to the elastic deformation of the device during loading-unloading cycles, and the viscoelastic behavior of the silicone.

Example 5

The compressive gauge factor (GF) for sample tactile sensors was evaluated.

The sensitivity of the tactile sensor to strain can be expressed quantitatively as the gauge factor (GF). The GF is defined as the ratio of fractional change in electrical current to the fractional change in length (strain) (EQUATION 1), where I is the measured current at certain strain, $I_0$ is the initial current, $\varepsilon$ is the strain, and L is length.

$$GF = \frac{\Delta I/I}{\Delta L/L} = \frac{\Delta I/I}{\varepsilon} = \frac{(I-I_0)/I_0}{\varepsilon} \quad \text{Equation 1}$$

Figure 17:
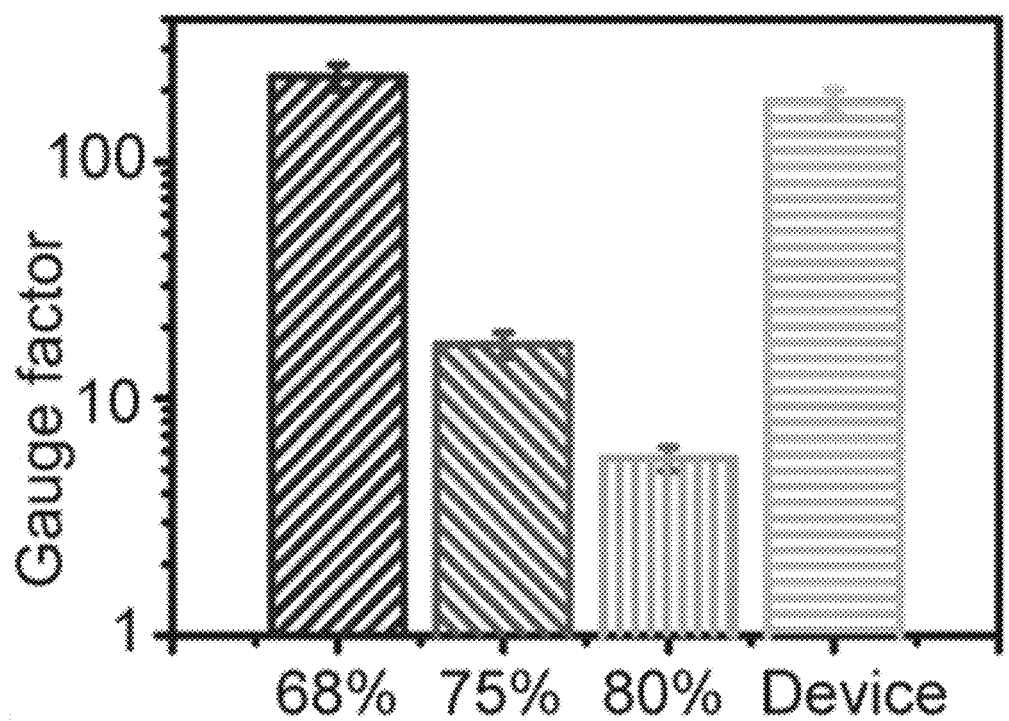
FIG. 17 is a chart comparing the gauge factor of a sample tactile sensor with conductive compositions including different concentrations of silver particles.

FIG. 17 is a chart comparing the gauge factor of a sample tactile sensor with conductive compositions including different concentrations of silver particles. As seen in FIG. 17, the GF for the sensor was found to be ~180, which was similar to that of the 68 wt. % composition and to single crystal silicon. This phenomenon demonstrated that the sensor layer (made with the 68 wt. % composition) dominated the electromechanical properties of the printed devices under compressive strains.

Figure 18:
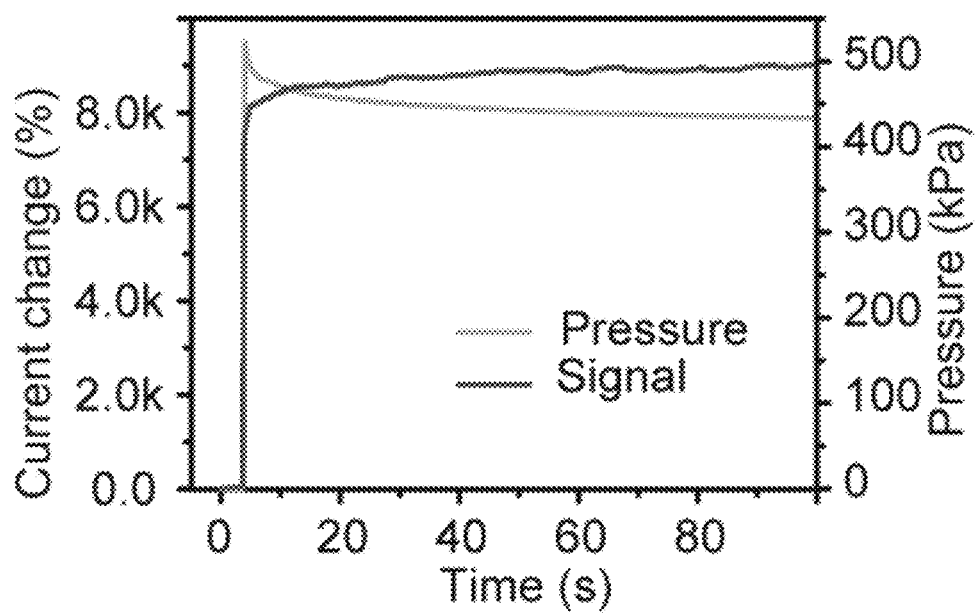
FIG. 18 is a chart illustrating current change in response to an applied constant strain of a sample additively manufactured tactile sensor.
Figure 19:
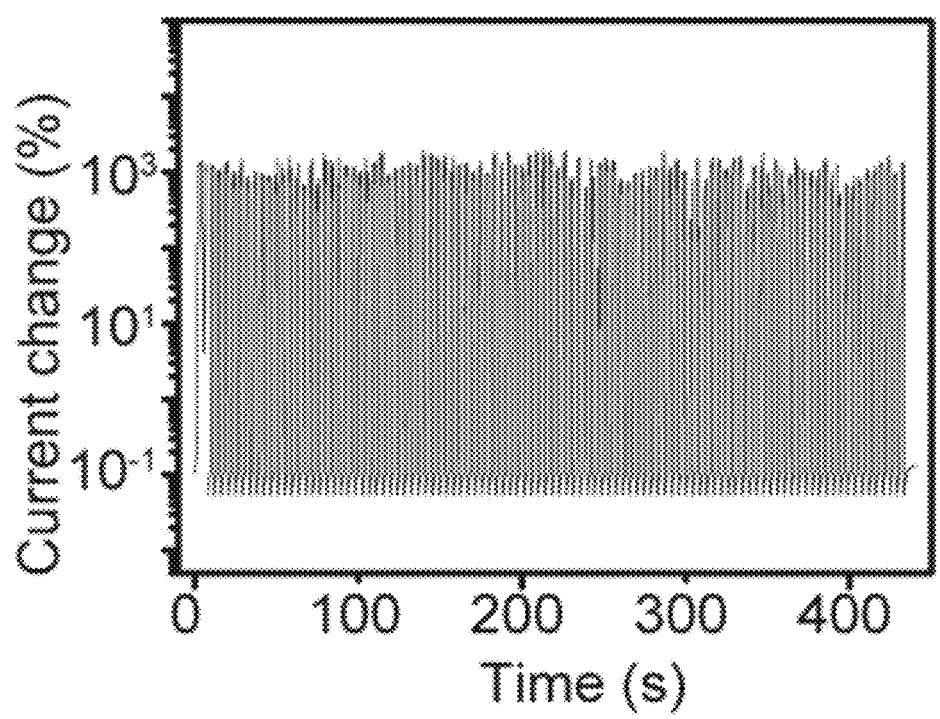
FIG. 19 is a chart illustrating current change in response to applied tactile pressure cycles of a sample additively manufactured tactile sensor.

FIG. 18 is a chart illustrating current change in response to an applied constant strain of a sample additively manufactured tactile sensor. As seen in FIG. 18, when a constant strain (initial pressure 500 kPa) was applied to the device, the current change sharply increased by 8000% within a few seconds; and the output signal gradually reached a plateau. FIG. 19 is a chart illustrating current change in response to applied tactile pressure cycles of a sample additively manufactured tactile sensor. As seen in FIG. 19, the device also exhibited consistent responses even under >100 cycles of applied pressure.

Example 6

Figure 20:
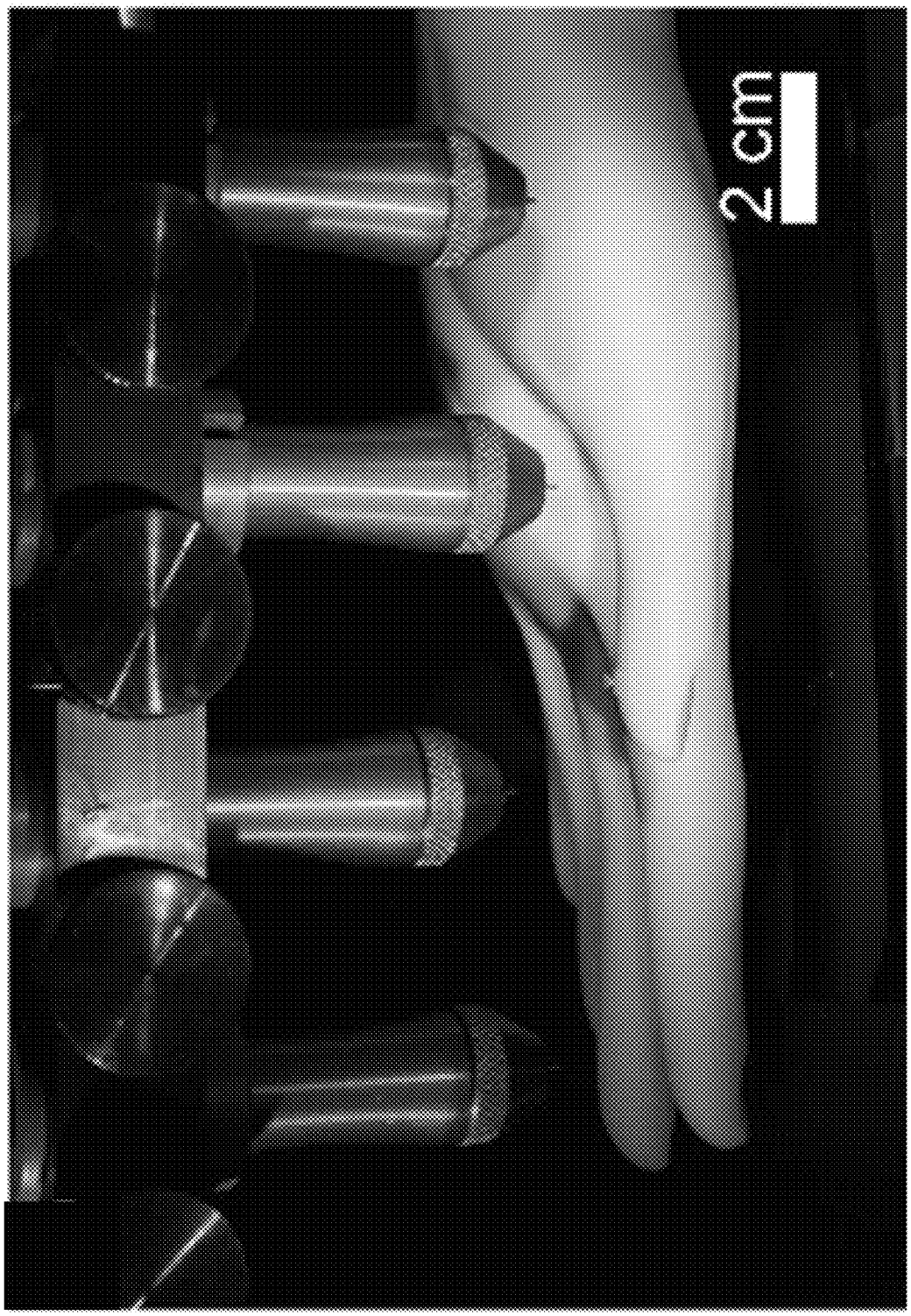
FIG. 20 is a photograph showing a side-view image of an example system for additively manufactured electronic components by multi-material printing.

A multi-material printing system was used to additively manufacture (conformally print) the sensor on a substrate having a curved surface. FIG. 20 is a photograph showing a side-view image of an example system for additively manufactured electronic components by multi-material printing. As seen in FIG. 20, the system included four nozzles for respectively extruding different conductive compositions, and a substrate that was a replica of a hand. Printing was carried out using a custom-built 3D printer based on a gantry system AGS 1000 (Aerotech, Pittsburgh, Pa.) with two independent z-axis, which translate the printing head in the prescribed pattern. Four dispensing apparatuses HP7x (Nordson EFD, Westlake, Ohio) were used to deposit the four inks through micro-nozzles with 100 μm inner diameter 5132-0.25-B (Nordson EFD, Westlake, Ohio). Each z-axis controlled two dispensing apparatuses with different heights, which ensured that the first printing tip would not touch the base when the other was printing. All printing paths were controlled using G-code commands, which were generated by Slic3R software from 3D models.

Figure 21A:
FIG. 21A is a photograph showing a side-view image of an example tactile sensor including a support layer printed on a hand-shaped substrate using the example system of FIG. 20.
Figure 21B:
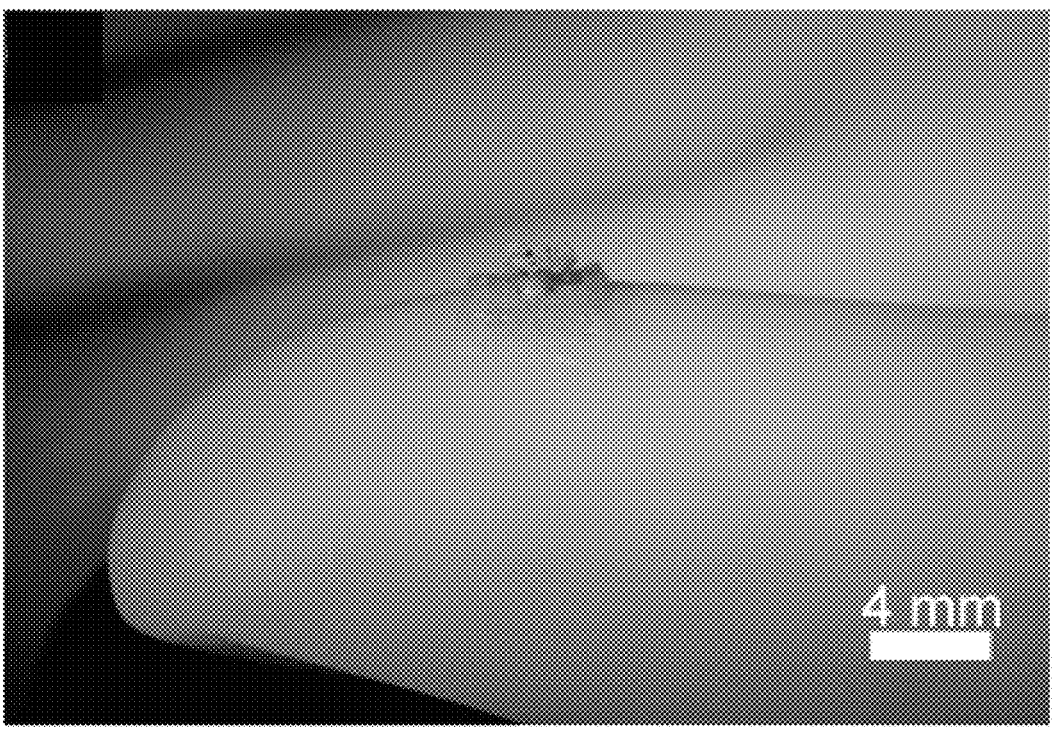
FIG. 21B is a photograph showing a side-view image of an example tactile sensor without a support layer printed on a hand-shaped substrate using the example system of FIG. 20.

A hand model was first scanned using a 3D structured light scanning (SLS) technique to obtain the geometrical information of complex freeform objects such as the hand. A 3D model with the topological information of the hand model was generated in point cloud format. Then, the point cloud format was transformed to 3D polygon meshes, to redesign the tactile sensor so that it was conformal to the surface of the fingertip. Finally, the tactile sensor was directly printed on the fingertip by using the system of FIG. 20. FIG. 21A is a photograph showing a side-view image of an example tactile sensor including a support layer printed on a hand-shaped substrate using the example system of FIG. 20. FIG. 21B is a photograph showing a side-view image of an example tactile sensor without a support layer printed on a hand-shaped substrate using the example system of FIG. 20.

The sensing behavior of the printed tactile sensor on the fingertip upon a pressing by a human finger was evaluated. The amplitude of the output signal varied with the pressing forces applied with a time interval of 5 sec. Upon applying a weak finger press (~100 kPa), the sensor responded with a current change of 5000%. When a strong press was applied (~400 kPa), the signal intensity increased to 8000%. These distinguishable response signals also demonstrated the capability of the device for detecting and differentiating human movements.

Example 7

Figure 22A:
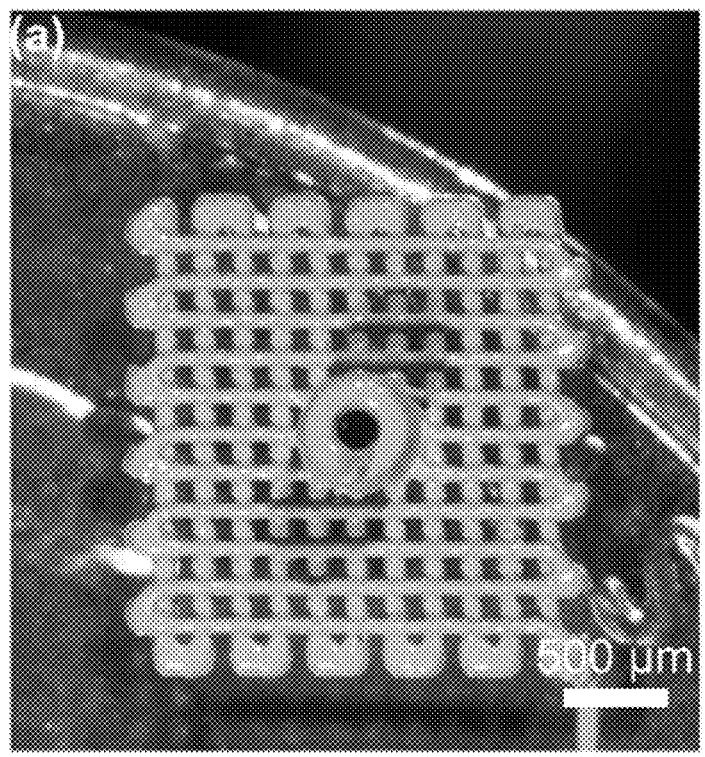
FIG. 22A is a photograph showing a top-view image of a sensor pixel of a sample additively manufactured tactile sensor array.
Figure 22B:
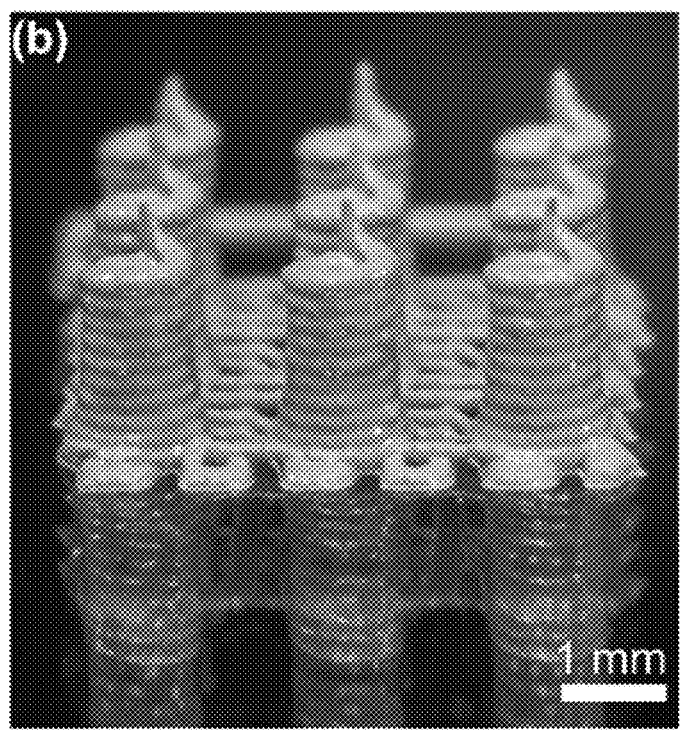
FIG. 22B is a photograph showing a plan-view image of a sample additively manufactured tactile sensor array including 9 sensor pixels.
Figure 22C:
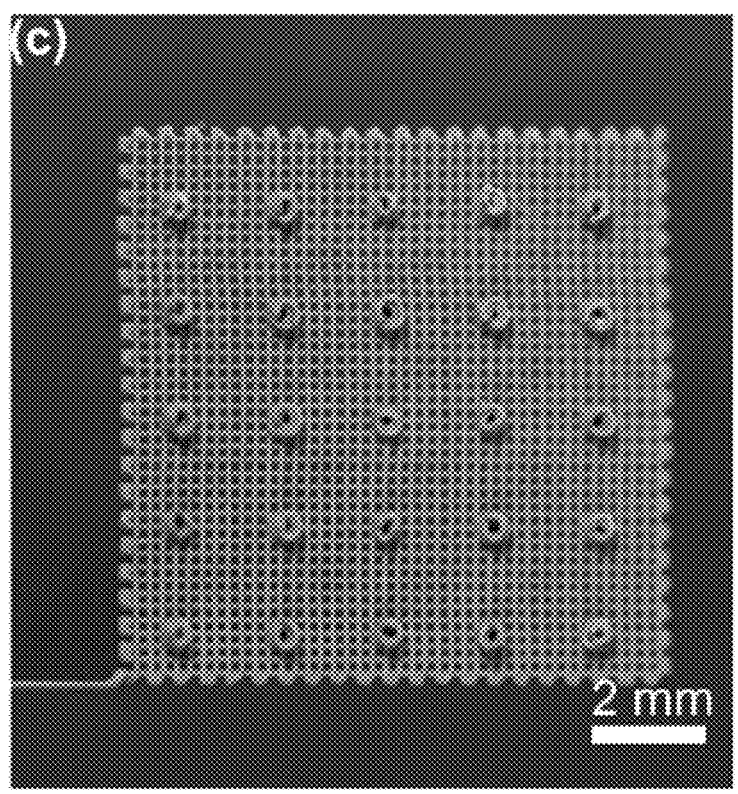
FIG. 22C is a photograph showing a top-view image of a sample additively manufactured tactile sensor array including 25 sensor pixels.

Sensor arrays were prepared. Sensor arrays were including a configuration of several pixels were used to collect spatially resolved pressure information. A 3×3 pixel array and a 5×5 pixel array was fabricated with a total area of 1×1 cm$^2$. FIG. 22A is a photograph showing a top-view image of a sensor pixel of a sample additively manufactured tactile sensor array. FIG. 22B is a photograph showing a plan-view image of a sample additively manufactured tactile sensor array including 9 sensor pixels. FIG. 22C is a photograph showing a top-view image of a sample additively manufactured tactile sensor array including 25 sensor pixels.

Individual pixels had a diameter of 1 mm, a height of 1.2 mm, and a common bottom electrode. To test the device, a triangular glass object (0.096 g) with a weight of 50 g was placed on top of the array, and it was observed that the magnitude of the output signal depended on the specific location of the object on the array.

Example 8

Figure 23:
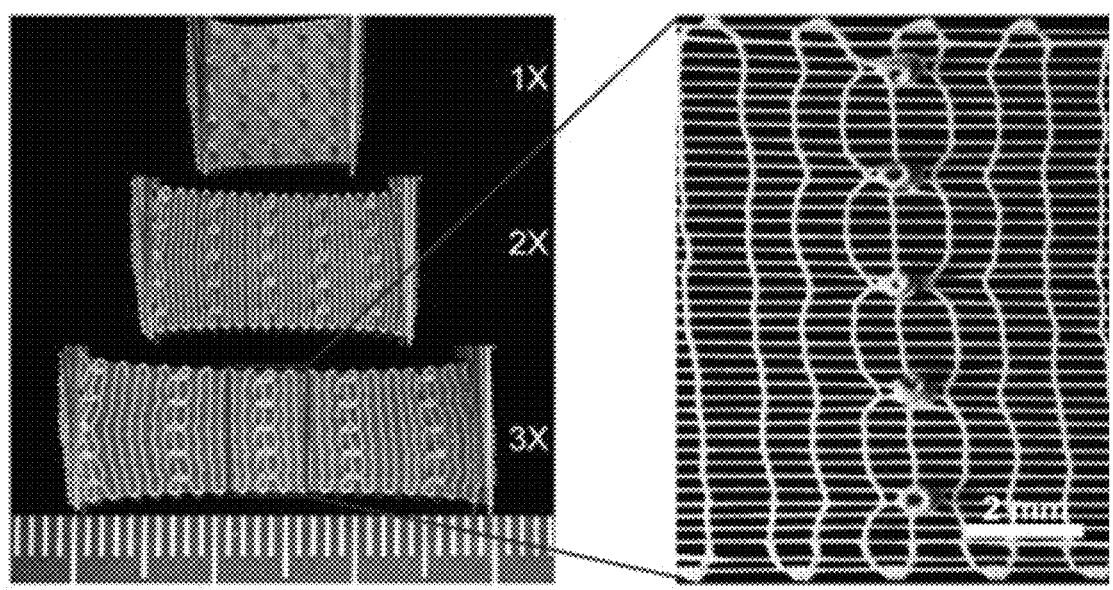
FIG. 23 is a photograph showing a top-view image of a sample additively manufactured tactile 5×5 pixel sensor array subjected to different strains.

Deformations of sample sensor subjected to compression and stretching were compared. Under typical loading scenarios, regions with higher stress and strain concentration were primarily located in the sensor layer, which indicated that the mechanical response of the device under compression was dominated by the properties of the 68 wt. % composition. FIG. 23 is a photograph showing a top-view image of a sample additively manufactured tactile 5×5 pixel sensor array subjected to different strains. In contrast to the compression loading scenario, when the device was cyclically stretched to 200% strain under a tensile stress, the deformation was generated on the electrode layers, and no obvious changes were observed on the sensor layer, as seen in FIG. 23. Thus, the composition with 75 wt. % silver determined the mechanical properties of the device under stretching.

Various examples have been described. These and other examples are within the scope of the following claims.

What is claimed is:

1. A tactile sensor comprising:
   at least one electrode layer; and
   at least one sensor element adjacent to the at least one electrode layer, wherein the at least one sensor element comprises a high-sensitivity cured conductive composition, wherein the high-sensitivity cured conductive composition comprises:
   a room-temperature cured silicone elastomeric matrix, and
   micron or sub-micron silver particles dispersed in the room-temperature cured silicone elastomeric matrix, wherein the micron or sub-micron silver particles exhibit a predetermined percolation threshold concentration (% weight/weight) with respect to the high-sensitivity cured conductive composition, and wherein the micron or sub-micron silver particles are present at a total concentration that is within ±2% units of the percolation threshold concentration,
   wherein the high-sensitivity cured conductive composition exhibits a pressure-dependent conductance sensitivity of at least 10,000% at 250 kPa.

2. The tactile sensor of claim 1, wherein the pressure-dependent conductance sensitivity of the high-sensitivity cured conductive composition is at least 17,000% at 250 kPa.

3. The tactile sensor of claim 1, wherein the at least one sensor element comprises a layer, a block, a coil, a tube, or a cylinder.

4. The tactile sensor of claim 3, wherein the at least one electrode layer comprises a top electrode layer and a bottom electrode layer, and wherein the sensor element is between the top electrode layer and the bottom electrode layer.

5. The tactile sensor of claim 1, wherein at least one electrode layer comprises a low-sensitivity cured conductive composition, and wherein the low-sensitivity cured conductive composition comprises:
   the room-temperature cured elastomeric composition, and
   micron or sub-micron silver particles dispersed in the room-temperature cured silicone elastomeric matrix, wherein the micron or sub-micron silver particles exhibit a predetermined percolation threshold concentration with respect to the low-sensitivity cured conductive composition, wherein the total concentration of the micron or sub-micron silver particles is greater than the percolation threshold concentration by at least 5% units, and
   wherein the low-sensitivity cured composition exhibits a pressure-dependent conductance sensitivity of less than 1,000% at 250 kPa.

6. The tactile sensor of claim 5, wherein the total concentration of the micron or sub-micron silver particles is about 75% by weight with respect to the low-sensitivity cured conductive composition.

7. The tactile sensor of claim 5, wherein the pressure-dependent conductance sensitivity of the high-sensitivity cured conductive composition is at least ten times the pressure-dependent conductance sensitivity of the low-sensitivity cured conductive composition.

8. The tactile sensor of claim 1, wherein the percolation threshold weight percentage concentration is about 67.45% by weight with respect to the high-sensitivity cured conductive composition.

9. The tactile sensor of claim 1, wherein the micron or sub-micron silver particles are present at a total concentration that is within ±1% units of the percolation threshold concentration.

10. The tactile sensor of claim 1, wherein the room-temperature cured silicone elastomeric matrix is configured to cure on a biological substrate.

11. The tactile sensor of claim 1, wherein the room-temperature cured silicone elastomeric matrix is configured to cure on exposure to air, moisture, oxygen, or another chemical species.

12. The tactile sensor of claim 1, wherein the room-temperature cured silicone elastomeric matrix is configured to may cure as a result of a chemical reaction between two or more components.

13. The tactile sensor of claim 1,
   wherein the at least one electrode layer is a common electrode layer, and
   wherein the at least one sensor element comprises an array of a plurality of sensor elements adjacent to the common electrode layer.

14. A sensor system, comprising:
   one or more tactile sensors, wherein each tactile sensor comprises:

at least one electrode layer; and at least one sensor element adjacent to the at least one electrode layer, wherein the at least one sensor element comprises a high-sensitivity cured conductive composition, wherein the high-sensitivity cured conductive composition exhibits a pressure-dependent conductance sensitivity of at least 10,000% at 250 kPa, and wherein the high-sensitivity cured conductive composition comprises:

a room-temperature cured silicone elastomeric matrix, and micron or sub-micron silver particles dispersed in the room-temperature cured silicone elastomeric matrix, wherein the micron or sub-micron silver particles exhibit a predetermined percolation threshold concentration (% weight/weight) with respect to the high-sensitivity cured conductive composition, and wherein the micron or sub-micron silver particles are present at a total concentration that is within ±2% units of the percolation threshold concentration; and a computing device configured to measure a relative change in current from each tactile sensor of the one or more tactile sensors, wherein the relative change in current is indicative of a dimensional change of the respective tactile sensor.

15. The sensor system of claim 14, wherein the sensor system is further configured to determine a change in pressure on the respective tactile sensor based on the relative change in current from the respective tactile sensor.

16. The sensor system of claim 14, wherein the sensor system is further configured to determine a change in strain on the respective tactile sensor based on the relative change in current from the respective tactile sensor.

17. The sensor system of claim 14, wherein the one or more tactile sensors comprise an array of a plurality of sensor elements adjacent to a common electrode layer, and wherein the computing device is further configured to determine a position of an object on the one or more tactile sensors based on a relative amplitude of the relative change in current for each sensor element of the plurality of sensor elements.

18. A method, comprising;

forming a tactile sensor, wherein the tactile sensor comprises:

at least one electrode layer; and at least one sensor element adjacent to the at least one electrode layer, wherein the at least one sensor element comprises a high-sensitivity cured conductive composition, wherein the high-sensitivity cured conductive composition comprises:

a room-temperature cured silicone elastomeric matrix, and micron or sub-micron silver particles dispersed in the room-temperature cured silicone elastomeric matrix, wherein the micron or sub-micron silver particles exhibit a predetermined percolation threshold concentration (% weight/weight) with respect to the high-sensitivity cured conductive composition, and wherein the micron or sub-micron silver particles are present at a total concentration that is within ±2% units of the percolation threshold concentration, wherein the high-sensitivity cured conductive composition exhibits a pressure-dependent conductance sensitivity of at least 10,000% at 250 kPa.

19. The method of claim 18, wherein forming the tactile sensor further comprises extruding a room-temperature curable conductive composition on the at least one electrode layer, and wherein the room-temperature curable conductive composition comprises micron or sub-micron silver particles dispersed in a room-temperature curable silicone elastomeric matrix.

20. The method of claim 18, wherein the tactile sensor is formed on skin tissue.

\* \* \* \* \*